United States Patent
Van Ho et al.

(10) Patent No.: US 11,841,832 B2
(45) Date of Patent: Dec. 12, 2023

(54) SYNCHRONIZING DESIGN MODELS

(71) Applicant: Nuvolo Technologies Corporation, Paramus, NJ (US)

(72) Inventors: Khoa Nguyen Van Ho, Houston, TX (US); Tao Ye, Cypress, TX (US); Tejas Yadav, West Haven, CT (US)

(73) Assignee: Nuvolo Technologies Corporation, Paramus, NJ (US)

( * ) Notice: Subject to any disclaimer, the term of this patent is extended or adjusted under 35 U.S.C. 154(b) by 35 days.

(21) Appl. No.: 17/203,470

(22) Filed: Mar. 16, 2021

(65) Prior Publication Data

US 2022/0300458 A1    Sep. 22, 2022

(51) Int. Cl.
*G06F 16/178*    (2019.01)
*G06F 16/11*    (2019.01)

(52) U.S. Cl.
CPC .......... *G06F 16/178* (2019.01); *G06F 16/116* (2019.01)

(58) Field of Classification Search
CPC ............................. G06F 16/178; G06F 16/116
USPC ........................................................ 707/626
See application file for complete search history.

(56) References Cited

U.S. PATENT DOCUMENTS

| | | | |
|---|---|---|---|
| 6,341,291 B1 * | 1/2002 | Bentley .................. | G06F 16/168 707/999.203 |
| 8,155,943 B2 * | 4/2012 | Nasle ...................... | G06F 30/20 715/964 |
| 8,818,769 B2 * | 8/2014 | Trainer ................... | G06F 30/00 703/1 |
| 9,454,623 B1 * | 9/2016 | Kaptsan .................. | G06F 30/00 |
| 10,121,286 B2 * | 11/2018 | Alsaffar .................. | G06T 11/20 |
| 10,445,438 B1 | 10/2019 | Motonaga et al. | |
| 10,503,603 B2 * | 12/2019 | Wilson .................... | G06F 30/00 |
| 10,937,033 B1 * | 3/2021 | Rodriguez ............. | G06N 20/00 |
| 2005/0050089 A1 * | 3/2005 | Minium ................ | G06F 40/154 |
| 2007/0186160 A1 * | 8/2007 | McArdle ................ | G06F 30/00 707/999.201 |
| 2008/0172605 A1 | 7/2008 | Smith | |

(Continued)

OTHER PUBLICATIONS

Github.com, [online] "Deepzoom (php library)", Daniel-KM Library Deepzoom, retrieved on Aug. 17, 2020, retrieved from URL: https://github.com/Daniel-KW/LibraryDeepzoom, 4 pages.

(Continued)

*Primary Examiner* — Cam Linh T Nguyen
(74) *Attorney, Agent, or Firm* — Mintz, Levin, Cohn, Ferris, Glovsky and Popeo, P.C.

(57) ABSTRACT

Methods, systems, and apparatus, including computer programs encoded on a computer storage medium, for performing a data sync operation are described. A described technique includes receiving an indication to start a data synchronization between a first version of a computer design model and a second version of the computer design model. In some implementations, first data is extracted from the first version and second data is extracted from the second version. The first data is compared with the second data. Based on the comparison, the first data is updated using the second data, the second data is updated using the first data, or the first data is updated using the second data and the second data is updated using the first data. A geospatial representation is generated using at least one of the updated second data or the updated first data.

20 Claims, 5 Drawing Sheets

(56) References Cited

U.S. PATENT DOCUMENTS

| | | | | |
|---|---|---|---|---|
| 2010/0169272 | A1* | 7/2010 | Labatte | G06Q 10/06 |
| | | | | 707/674 |
| 2015/0106325 | A1 | 4/2015 | Cole et al. | |
| 2015/0293941 | A1* | 10/2015 | Eichhorn | G16H 30/20 |
| | | | | 707/723 |
| 2015/0379241 | A1* | 12/2015 | Furst | G16H 10/60 |
| | | | | 705/3 |
| 2016/0246899 | A1* | 8/2016 | Hirschtick | G06F 30/17 |
| 2016/0328421 | A1 | 11/2016 | Sarratori et al. | |
| 2017/0147717 | A1 | 5/2017 | Chen et al. | |
| 2017/0148227 | A1* | 5/2017 | Alsaffar | G06F 30/20 |
| 2018/0052832 | A1* | 2/2018 | Anglin | G06F 40/58 |
| 2018/0113878 | A1* | 4/2018 | Duggal | G06F 16/1844 |
| 2019/0213287 | A1 | 7/2019 | Ye et al. | |
| 2019/0228020 | A1* | 7/2019 | Sawatzky | G06F 16/273 |
| 2020/0285514 | A1 | 9/2020 | Ghare et al. | |
| 2020/0328913 | A1* | 10/2020 | Wyas | G06F 16/903 |
| 2020/0351337 | A1 | 11/2020 | Calmon et al. | |
| 2020/0401593 | A1* | 12/2020 | Panuganty | G06F 9/4881 |
| 2021/0073449 | A1 | 3/2021 | Segev et al. | |
| 2021/0383037 | A1 | 12/2021 | Segev et al. | |
| 2022/0067454 | A1* | 3/2022 | Gupta | G06K 9/6269 |
| 2022/0092225 | A1 | 3/2022 | Parker et al. | |
| 2022/0092834 | A1 | 3/2022 | Ye et al. | |
| 2022/0171892 | A1 | 6/2022 | Ho et al. | |
| 2022/0171893 | A1 | 6/2022 | Ye et al. | |
| 2022/0188472 | A1 | 6/2022 | Parker | |
| 2022/0206445 | A1 | 6/2022 | Reichl et al. | |
| 2022/0206856 | A1 | 6/2022 | Parker | |
| 2022/0214999 | A1 | 7/2022 | Yadav et al. | |
| 2022/0215604 | A1 | 7/2022 | Ho et al. | |

OTHER PUBLICATIONS

Github.com, [online] "TiledSharp", Marshallward/TiledSharp, retrieved on Aug. 17, 2020, retrieved from URL: https://github.com/marshallward/TiledSharp, 4 pages.

Stackexchange.com, [online] "If Geographic Coordinates are unprojected coordinates, how can GIS soft wares display such unprojected data in a plane?", Geographic Information Systems, retrieved on Jun. 2, 2020, retrieved from URL: https://gis.stackexchange.com/questions/146321/if-geographic-coordinates-are-unprojected-coordinates-how-can-gis-softwares-dis#:-: text, 2 pages.

Wikipedia, "Map projection", retrieved from URL: https://en.wikipedia.org/w/index.php?title=Map_projection&oldid=955953903, 2020, 16 pages.

Wikipedia, "Spatial reference system", retrieved from URL: https://en.wikipedia.org/w/index.php?title=Spatial_reference_system&oldid=956142752, 2020, 4 pages.

Wikipedia, "Tiled web map", retrieved from URL: https://en.wikipedia.org/w/index.php?title=Tiled_web_map&oldid=956139437, 2020, 3 pages.

Ekanayake et al. (2008) "MapReduce for Data Intensive Scientific Analysis", Fourth IEEE International Conference on eScience, 277-284 Pages.

Chen et al. (2019) "Floor-SP: Inverse CAD for Floorplans by Sequential Room-Wise Shortest Path", IEEE International Conference on Computer Vision (ICCV), 10 pages.

Muller et al. (2006) "Procedural Modeling of Buildings", Association for Computing Machinery, Inc., 25(3):614-623.

Zhu et al. (Dec. 19, 2013) "A New Reconstruction Method for 3D Buildings From 2D Vector Floor Plan", HAL Open Science, pp. 1-14(15 pages).

* cited by examiner

| | Space Code | Action | Space Attribute | CAD Value | CAFM Value | Mismatch Found | Active | Status Code | Status Message |
|---|---|---|---|---|---|---|---|---|---|
| ▼ Space Code: 153 (4) | | | | | | | | | |
| ☐ | 153 | Use CAD Value | Space Name | STAIR | | true | true | | |
| ☐ | 153 | No Action | Space Type | STAIR | | true | true | ● Error | Invalid CAD Value. Please verify and val... |
| ☐ | 153 | Use CAD Value | CAFM Area | 0.3043 | | true | true | | |
| ☐ | 153 | Use CAD Value | Seat Status | Active | | true | true | | |
| ▼ Space Code: 301 (4) | | | | | | | | | |
| ☐ | 301 | No Action | Space Name | CORRIDOR | Corridor | true | true | | |
| ☐ | 301 | Use CAD Value | Space Type | | | true | true | | |
| ☐ | 301 | Use CAD Value | CAFM Area | 0.6497 | | true | true | | |
| ☐ | 301 | No Action | Seat Status | Active | | true | true | | |
| ▼ Space Code: 302 (4) | | | | | | | | | |
| ☐ | 302 | Use CAFM Value | Space Name | Work Room | Office | true | true | ● Warning | Conflict: CAD Value does not match CAFM... |

FIG. 3

SYNCHRONIZING DESIGN MODELS

TECHNICAL FIELD

This description relates to computing processes for converting electronic files.

BACKGROUND

Computer design models such as computer-aided design ("CAD") models are commonly used to represent real-world constructs. Sometimes it is helpful to maintain a local version of a computer design model in addition to a remote or backup version. However, this can often lead to data conflicts between the different versions that may be difficult to resolve. Existing solutions may be inadequate due to significant limits on the control and customization available during the resolution process.

SUMMARY

Systems and techniques for performing data synchronization between documents corresponding to a computer-aided design model are described. A data sync module, which can execute such techniques, can compare data elements (e.g., space elements) extracted from a CAD program version of the computer-aided design model to corresponding data in a remote management platform. The data sync module may use the results of the comparison to update the CAD version of the computer-aided design model, the corresponding data stored on the remote management platform, or a combination of the CAD version of the computer-aided design model and the corresponding data stored on the remote management platform. In performing data synchronization, the data sync module may automatically determine for each of the data elements whether to use the CAD value(s) or the corresponding remote management platform value(s). The data sync module may generate, from a synchronized version of the computer-aided design model, an interactivity layer containing polylines that define different areas and corresponding space codes that describe those areas. The interactivity layer can be used by other components of a system that includes the data sync module to, for example, present an updated computer-aided design model.

In some implementations, in performing the data synchronization between a computer-aided design model and a remote management platform, the data sync module identifies conflicts between the computer-aided design model and the remote management platform. These conflicts may include, for example, conflicting data element values and definitions. As an example, conflicts may arise when a client having access to the remote management platform provides management updates, such as updates to space attributes and definitions through the management platform for one or more computer-aided design models. Similarly, conflicts may arise when updates independently made to the computer-aided design model, such as by an architect of the model, to modify the layout of the model and/or to add, remove, or modify objects within the model.

In some implementations, in performing the data synchronization, the data sync module resolves conflicts identified between the one or more computer-aided design models and the remote management platform. As an example, in resolving these conflicts, the data sync module may import values such as space attributes and definitions of the remote platform into the computer-aided design model. Additionally or alternatively, the data sync module can resolve one or more of these conflicts by extracting values corresponding to previous modifications made to computer-aided design model and importing these values for storage on the remote management platform.

In some implementations, in resolving conflicts between the one or more computer-aided design models and the remote management platform, the data sync module resolves conflicts according to a set of predetermined rules. As an example, the rules may include preferences for values and/or definitions of the computer-aided design model or corresponding data on the remote management platform. The preferences may be set by an administrator or automatically determined by the system. As an example, the system may automatically default to using values extracted from the CAD version of the computer-aided design model over the corresponding values in the remote management platform. An administrator may be able to override or modify these default rules.

In some implementations, in performing data synchronization, the data sync module generates an output file. The output file may be an interactivity layer, such as a GeoJSON file. As an example, after updating values of the computer-aided design model, the data sync module may convert the updated computer-aided design model to a DXF file format, parse the DXF file to extract a polygon layer and a geospatial layer, and use the extracted data to generate a GeoJSON file that serves as an interactive layer.

In one general aspect, a method includes: receiving an indication to start a data synchronization between a first version of a computer design model stored on a device or extracted from a file stored on the device and a second version of the computer design model stored on a database of a management platform, the database being remote with respect to the device; extracting first data from the first version of the computer design model; extracting second data from the second version of the computer design model; comparing the first data with the second data; based on the comparison, updating at least one of the first data using at least a portion of the second data or the second data using at least a portion of the first data; and generating a geo spatial representation using at least one of the updated second data or the updated first data.

Implementations may include one or more of the following features. For example, in some implementations, receiving input indicating a modification to the second version of the computer design model, where the modification is one or more of the following a modification to an attribute corresponding to the computer design model, an addition of an attribute corresponding to the computer design model, a removal of an attribute corresponding to the computer design model, an addition of a geospatial area to the computer design model, or the removal of an existing geospatial area from the computer design model, and where updating the first data using at least the portion of the second data includes updating the first data to reflect the modification to the second version of the computer design model.

In some implementations, the attribute includes one or more of the following: an identification of a geospatial area; a location of a geospatial area; one or more shapes that describe bounds of a geospatial area; a type of geospatial area; a size of a geospatial area; a size or size range of a type of geospatial area; a capacity of a geospatial area; or a capacity or capacity range of a type of geospatial area.

In some implementations, the method includes: identifying one or more other computer design models associated with the computer design model; extracting data from the one or more other computer design models; based on the data from the one or more other computer design models and the second data, determining that the second version of the computer design model and the one or more other computer design models share at least one attribute corresponding to the modification to the second version of the computer design model; and based on the modification to the second version of the computer design model, updating the at least one attribute shared by the second version of the computer design model and the one or more other computer design models.

In some implementations, identifying the one or more other computer design models associated with the computer design model includes determining that the one or more other computer design models and the computer design model correspond to the same client.

In some implementations, comparing the first data with the second data includes: identifying a conflict between the first data and the second data; and determining that the conflict should be resolved in favor of the second data, where updating the first data using at least the portion of the second data includes updating the first data using a portion of the second data corresponding to the conflict.

In some implementations, determining that the conflict should be resolved in favor of the second data includes: accessing preferences; and determining that the conflict should be resolved in favor of the second data based on the preferences.

In some implementations, the conflict corresponds to a particular attribute of the computer design model such that the first version of the computer design model has a first value for the attribute and the second version of the computer design model has a second value for the attribute that is different from the first value; the preferences indicate that for the attribute the first version of the computer design model has priority over the second version of the computer design model; and determining that the conflict should be resolved in favor of the second data based on the preferences includes determining that the conflict should be resolved in favor of the second data based on the first version of the computer design model having priority for the attribute over the second version of the computer design model.

In some implementations, comparing the first data with the second data includes: determining that a second portion of the first data is incomplete; and based on the second portion of the first data being incomplete, determining that a portion of the second data corresponding to the second portion of the first data should be used to update the first data, where updating the first data using at least the portion of the second data includes updating the first data using the portion of the second data corresponding to the second portion of the first data that is incomplete.

In some implementations, generating the geospatial representation includes: extracting a polygon layer from the computer design model, the polygon layer containing multiple polygons that correspond to representations of geospatial areas in the computer design model; extracting a geospatial identification layer from the computer design model, the geospatial identification layer containing multiple identifications that correspond to the representations of geospatial areas in the computer design model; and iteratively matching the polygons in the polygon layer with corresponding identifications in the geospatial identification layer.

In some implementations, iteratively matching the polygons in the polygon layer with the corresponding identifications in the geospatial identification layer includes determining for each polygon and identification pair that a geospatial area corresponds to both the polygon and identification such that a location associated with identification is bounded by its corresponding polygon.

In some implementations, the method includes: requesting the first version of the computer design model that has been updated using the updated first data from the device; and importing the updated first version of the computer design model into the management platform, where extracting the polygon layer from the computer design model includes extracting the polygon layer from the updated first version of the computer design model, and where extracting the geospatial identification layer from the computer design model includes extracting the geospatial identification layer from the updated first version of the computer design model.

In some implementations, the method includes: determining that the data synchronization between the first version of the computer design model and the second version of the computer design model was successful; and in response to the determination, generating a notification indicating that the data synchronization between the first version of the computer design model and the second version of the computer design model was successful.

In some implementations, the method includes: presenting on an interface of the platform a table that includes: a first column containing multiple values of the first data; a second column containing multiple values of the second data; and multiple rows that correspond to different attributes of the computer design model; determining that there is an error corresponding to at least one value of the of the multiple values of the first data or the multiple values of the second data; and based on the error, visually distinguishing the at least one value from one or more other values in the table.

In some implementations, determining that there is an error corresponding to the at least one value includes: determining that a first value of the multiple values of the first data does not match a corresponding second value of the multiple values of the second data, where visually distinguishing the at least one value from one or more other values in the table includes visually distinguishing the first value and the second value from one or more other values in the table; determining that a first value of the multiple values of the first data is a null value and corresponds to a second value of the multiple values of the second data that is a valid value, where visually distinguishing the at least one value from one or more other values in the table includes visually distinguishing the first value from one or more other values in the table; or determining that a first value of the multiple values of the second data is a null value and corresponds to a second value of the multiple values of the first data that is a valid value, where visually distinguishing the at least one value from one or more other values in the table includes visually distinguishing the first value from one or more other values in the table.

In some implementations, updating at least one of the first data using at least a portion of the second data or the second data using at least a portion of the first data includes updating the first data using at least a portion of the second data and the second data using at least a portion of the first data.

In some implementations, the method includes filtering information from the first version of the computer design model, where extracting the first data from the first version of the computer design model includes extracting the first data from the filtered first version of the computer design model.

In some implementations, filtering the information from the first version of the computer design model includes: identifying a template that indicates what information or types of information should be filtered; and using the template to filter the information from the first version of the computer design model.

Other embodiments of these aspects include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The described techniques can be used to realize various advantages. For example, the techniques disclosed provide for improved management of computer design models. Notably, the disclosed system provides for the collective management of multiple computer design models without having to directly edit each of the design models and/or interfere with the individual architects of those design models. Management updates, such as updates to space attributes and definitions can be efficiently imported from a remote database into one or more of the multiple computer design models while changes made to the layouts and/or objects of one or more of the multiple computer design models can be extracted and imported into the remote database through a single data synchronization process. Data conflicts that arise between the design models and the corresponding data stored in the remote database can be discovered during the synchronization process and be efficiently resolved through the automatic application of intelligence rules or through direct input.

BRIEF DESCRIPTION OF THE DRAWINGS

FIG. 3 illustrates an example user interface for performing a data sync operation.

Like reference numbers and designations in the various drawings indicate like elements.

DETAILED DESCRIPTION

A data sync module compares data elements extracted from a CAD program version of a computer-aided design model to corresponding data in a remote management platform. The data sync module may use the results of the comparison to update the CAD version of the computer-aided design model, the corresponding data stored on the remote management platform, or a combination of the CAD version of the computer-aided design model and the corresponding data stored on the remote management platform. In performing data synchronization, the data sync module may automatically determine for each of the data elements whether to use the CAD value(s) or the corresponding remote management platform value(s). The data sync module may generate, from a synchronized version of the computer-aided design model (e.g., the updated CAD version of the model after having been converted from a DWG file type to a DXF file type), an interactivity layer containing polylines that define different areas and corresponding space codes that describe those areas. The interactivity layer can be used by other components of a system that includes the data sync module to, for example, present an updated computer-aided design model.

Figure 1:
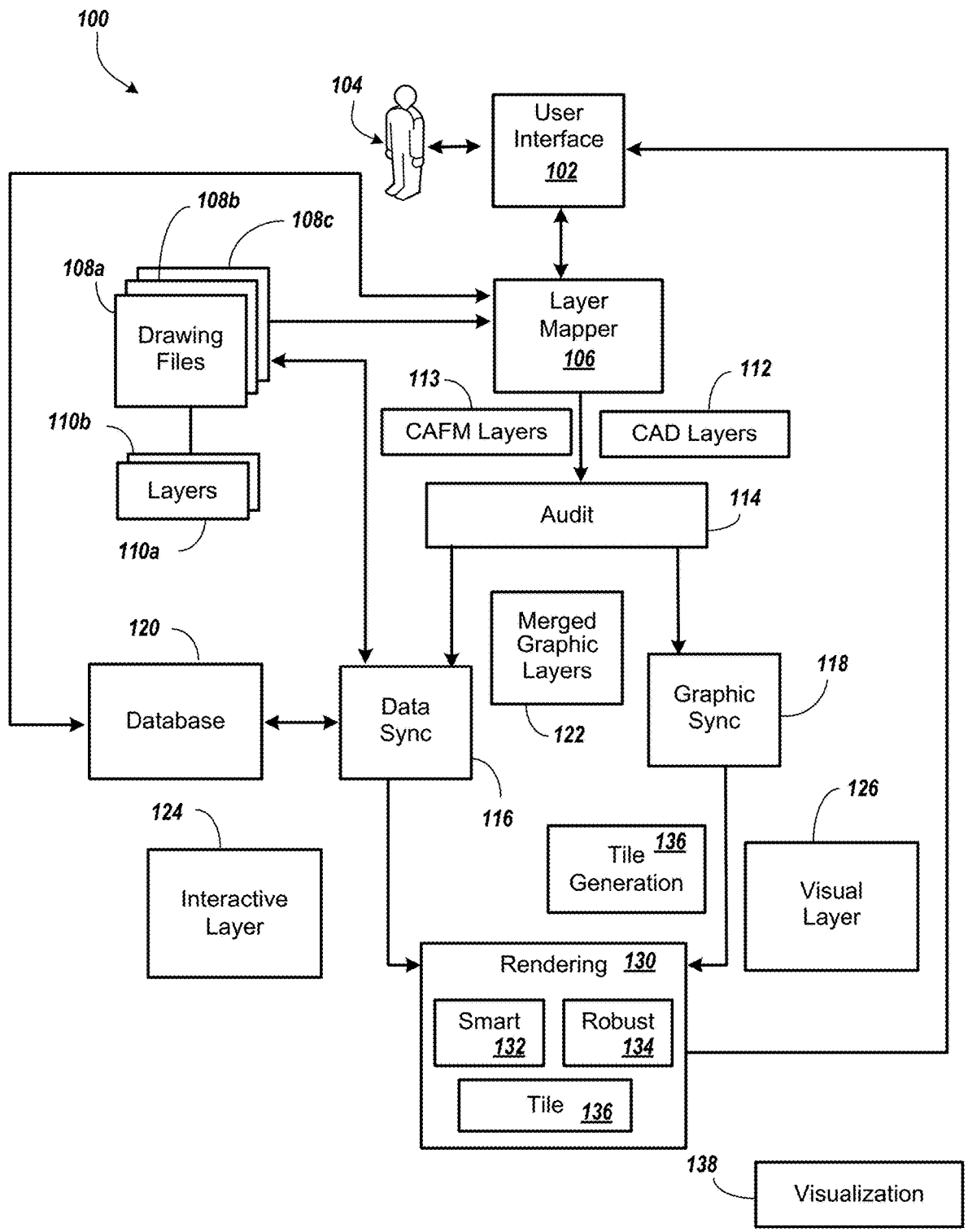
FIG. 1 illustrates an example computing system for obtaining information from one or more drawing files.

FIG. 1 illustrates an example computing system 100 ("system 100") configured to process one or more drawing files that each include multiple layers. Each layer of a respective drawing file can correspond to an item of a geographic entity, such as a building or physical location. For example, each of the multiple layers can correspond to a respective item such as a floorplan of a floor in the building, a room of a floor in the building that is represented by the floorplan, or an interior or exterior wall of a room included in the floorplan. Additional details about individual layers and corresponding items that may be associated with a given layer are described in more detail below.

In some implementations, the system 100 is configured to implement a framework for interpreting and extracting graphics and data elements of an example drawing file to digitally render the items of a building for presentation to the user 104. The graphics and data elements cooperate to present a digital representation of the items in an application program used to generate the drawing file. For example, the drawing file can be a DXF file generated by an example CAD program and encode data representations of real-world items, such as the example items described above. Example drafting/design programs may include various commercial CAD tools or related drafting software applications.

Data representations of real-world items in separate or distinct drawing files, or even across distinct layers of a drawing file, can be encoded and arranged differently based on design preferences and drafting protocols used in the CAD program. Because these data representations are often encoded in a variety of ways, extracting specific types of information from a drawing file can be challenging. To address these challenges, the system 100 includes a set of modules that are each configured to execute a subset of the techniques for implementation of the framework used to extract graphics and data elements of a drawing file or present at least some of the extracted graphics, data elements, or both.

The system 100 generally includes a user interface 102 that receives input from a user 104. The user interface 102 can be a graphical interface rendered for display at an example computing device of the system 100. Although not depicted in the example of FIG. 1, the computing device can be any known device operable to display a graphical interface, such as a desktop computer with a display monitor, a laptop computer, a tablet device, a smartphone, a networked client/mobile device, or other related devices. The computing device is operable to exchange data communications with other devices (e.g., client and server devices) of the system 100.

The system 100 includes a layer mapper 106 configured to receive drawing files 108*a*, 108*b*, 108*c* (drawing files 108). Each drawing file 108*a*, 108*b*, 108*c* includes one or more layers indicated generally as layers 110*a*, 110*b*. In some implementations, the layer mapper 106 obtains the drawings files 108 based on input from user 104 that is received by way of user interface 102. The layer mapper 106 can receive or obtain the drawing files 108 independent of input from user 104 but execute its file audit and data processing operations based on user input received by way of user interface 102.

In some implementations, the layer mapper 106 automatically imports the drawing files 108 from a file storage location and automatically executes its layer mapping and data processing operations. The file storage location may be internal or external to the system 100. For example, the file storage location may correspond to a database 120 (described in more detail below) that includes database tables for storing information about space hierarchies of a geographic location. The space hierarchies may define a physical layout of a region, campus, site, or floor of the geographic location.

The layer mapper 106 is configured to receive or obtain, as inputs, each of the drawing files 108 and generate a layer mapping file based on processes performed on the received inputs. The processes may be executed by the layer mapper 106 based on a mapping template, user input from user 104, or both. In some implementations, the layer mapper 106 generates a layer mapping file based on instructions or commands specified by a space/system administrator ("space admin") that indicate operations to be performed on the drawing files 108. The instructions can define or indicate layers of the drawing files 108 as well as computer-aided facility management ("CAFM") layers stored among database tables of the system 100.

The layer mapper 106 can select a mapping template that defines protocols for aggregating sets of data values of the different layers with respect to instructions and database values of CAFM layers as indicated by a space admin. For example, the layer mapper 106 can receive layer data for multiple layers of a drawing file 108b, where the layer data specifies information for items such as hallways, offices on a floor, types of furniture in the offices, locations of security cameras on the floor, or capabilities of various Wi-Fi hotspots on the floor. The layer mapper 106 can use the template protocols to aggregate values for types of office furniture for a particular office while, for example, filtering out data values that indicate locations of security cameras on a floor.

More specifically, for one or more drawing files 108, the layer mapper 106 can map portions of the layer data for different layers, such as furniture in the offices, to a hierarchy of the CAFM layers 113 (e.g., indicating each office on a floor) as defined in the database to produce a grouping of CAD layers 112. For example, the grouping of CAD layers 112 can represent a group of offices on the 9th floor of a building along with each item of furniture in each office of the group. In some implementations, the layer mapper 106 determines the mapping between the drawing layers 110 and the CAFM layers 113 at least by processing data values of the different drawing layers (e.g., received inputs) against the protocols defined by the mapping template and with reference to any grouping preferences indicated by the user 104 or the space admin.

The layer mapper 106 generates a layer mapping output represented by CAD layers 112 based on the mapping between layers of the drawing files 108 (e.g., the layers 110) and CAFM layers 113 in a database table of the system 100. In some implementations, the layer mapper 106 generates a layer mapping output that aggregates information such as data values and entity records of the received inputs based on the determined mapping of the layers. The layer mapper 106 can generate a layer mapping output that groups layer types such as the offices, the Wi-Fi hotspots, and the types of office furniture for visual rendering to an end-user, e.g., user 104 or a different user.

An audit module 114 receives or obtains, as inputs, each of the CAD layers 112 or an output of the layer mapper 106, and generates an audit output file based on processes performed on the received inputs. For example, the audit module 114 is configured to process data corresponding to each of the CAD layers 112 to identify one or more deficiencies and generate an audit output file based on the identified deficiencies. The audit module 114 can scan each of the CAD layers 112 to detect or identify individual deficiencies that will disrupt or adversely impact a file (or layer) importation process executed by the system 100. For example, the audit module 114 can read entity records that store data values for a layer to detect deficiencies such as unclosed polylines, missing space codes, missing space names, or invalid space types. In some implementations, the audit module 114 detects deficiencies of a drawing file in response to processing data types of a layer or entity record of the drawing file against a predefined list of deficiency codes.

The audit module 114 can be configured to generate recommendations for addressing detected deficiencies of a drawing file. For example, the audit module 114 can generate a signal for a detected deficiency in response to determining that a data type for a space name linked to a layer, e.g., among CAD layers 112, is missing a value for the space code. The audit module 114 can determine that the layer corresponds to a room of a floor plan and generate a recommendation for updating the value of the space code to, for example, "room" or "office." In some implementations, the audit module 114 generates an instruction or command to automatically input a value for the missing space code.

In general, the audit module 114 is configured to standardize layer data of a drawing file for processing by one or more other modules or devices of the system 100. In the example of FIG. 1, the audit module 114 generates an audit output file from one or more groupings of CAD layers 112 based on processes performed on each of the CAD layers 112. The audit module 114 can provide the audit output file to two distinct modules included in the system 100 that perform respective sets of operations for syncing data and graphics for each CAD layer of the CAD layers 112 processed by the audit module 114. For example, the audit module 114 can provide the audit output file to the data sync module 116 and the graphic sync module 118.

The system 100 includes a data sync module 116 and a graphics sync module 118. As described above, the system 100 interprets and extracts graphics and data elements of an example drawing file at least to digitally render certain real-world items of a building for visualization to an end-user. The data sync module 116 is configured to extract the data elements of the example drawing file, whereas the graphics sync module 118 is configured to extract the graphic elements of the drawing file. Each of the data sync module 116 and the graphics sync module 118 executes its respective extraction and syncing operations based on inputs that correspond to the audit output file generated by the audit module 114 and the data associated with the one or more drawing files 108.

The data sync module 116 can execute a workflow for extracting data values of layers identified in the mapping output and for generating data structures used to stage or preview information linked to groupings of layers in the mapping output. The graphics sync module 118 can execute a workflow for reading and exporting graphical (or spatial) elements of layer data for each of the layers in a grouping specified by the mapping output. In some implementations, to export this graphical data of the layers, the graphics sync module 118 calculates dimensional bounds that are used to generate layers including an interactive layer 124 and a visual layer 126.

In some implementations, the interactive layer 124 is represented with a format for encoding geographic data structures such as GeoJSON, which is standardized by RFC 7946 of the Internet Engineering Task Force (IETF).

In some implementations, the visual layer 126 is represented with graphics format such as scalable vector graphics (SVG). Other format types are possible. In some implementations, the respective outputs of the data sync module 116 and graphics sync module 118 can be stored in a database 120 and later accessed to generate a preview of the data and graphics for a layer or floorplan before final visual rendering. In some implementations, the respective outputs of the data sync module 116 and graphics sync module 118 can be provided to a rendering module 130.

The respective outputs of the data sync module 116 and graphics sync module 118 may be stored in a database 120 and later accessed to generate a preview of the data and graphics for a layer or floorplan before final visual rendering. Additionally, using outputs of the graphics sync module 118, the system 100 can generate a merged graphics layer 122 by overlaying dimensional coordinates of a GeoJSON file over dimensional coordinates of a scale vector graphics ("SVG") file or one or more images tiles generated from the SVG file. The merged graphics layer can be used for presentation of the preview of the data and graphics for the layer or floorplan, presentation of a final version of the layer or floorplan, or both. In some implementations, the system 100 generates the merged graphics layer 122 based on intelligent analytics and calculations related to spatial coordinates and bounds for respective coordinate systems of the SVG file and GeoJSON file or the one or more image tiles and the GeoJSON file. This is described in more detail below.

To improve presentation of the merged graphics layer 122, a tile generation module 128 can generate multiple image tiles from an SVG file. The image tiles can have smaller file sizes, smaller dimensions, or both, than the SVG file. As a result, the system 100 can require fewer resources for presentation the image tiles on the user interface 102 than if the system 100 used the SVG file alone. For instance, when each image tile has a smaller file size, each image tile requires less memory than the memory required to store the SVG file. Further, the system 100 can send an image tile to the computing device more quickly than an SVG file because of the smaller file size.

In some implementations, the computing device that presents the user interface 102 can render the image tile more efficiently than the SVG file because of the smaller file size. When multiple image tiles depict the data for a single SVG file, the computing device can use multi-threading support, whether virtual or actual, to more quickly present the image tiles on the user interface 102 than presentation of the SVG file on the user interface 102. The computing device can use a first thread for presentation of a first image tile and a second thread for presentation of a second image tile.

The tile generation module 128 can decouple image tile generation from the graphic sync process by offloading image tile generation to a separate background process. For example, the graphics sync module 118 can extract graphic elements from a drawing file to generate an SVG file. After generation of the SVG file, the tile generation module 128 can generate the image tiles from the SVG file. Because image tile generation can take longer than the graphic element extraction process, the graphics sync module 118 can generate only an SVG file which generation process is faster than the image tile generation. This can enable the system 100 to present the merged graphics layer 122, e.g., in the user interface 102, using an SVG file, rather than image tiles more quickly than if the system 100 waited until the image tile generation process completed. Once the tile generation module 128 finishes generation of some of the image tiles, the system 100 can then use the image tiles for the merged graphics layer 122, taking advantage of the smaller file sizes of the image tiles.

The system 100 includes a rendering module 130 that leverages tile generation technology to visually (or graphically) render data and graphics for layers specified by the layer mapping output. In the example of the FIG. 1, the rendering module 130 is coupled for communication with user interface 102 to provide output parameters (e.g., data and graphics elements) for graphically rendering information for a layer as a display output at the user interface 102.

The rendering module 130 includes logic for a smart renderer 132 as well as for a robust renderer 134. The smart renderer 132 is configured to intelligently switch between non-tile SVG files and image tiles to improve presentation of the merged graphic layers 122 in the user interface 102. In some implementations, the smart renderer 132 enables the rendering module 130 to perform its rendering functions using fewer processor cycles, less memory resources, or both, when dynamic tiling functions of the smart renderer 132 are invoked at the rendering module 130. In some implementations, the smart renderer 132 can enable presentation of the merged graphics layer 122 more quickly using an SVG file than if the merged graphics layer 122 were only presented using image tiles. Hence, the smart renderer 132 can provide improved efficiency relative to other approaches for rendering graphical data at a display.

The robust renderer 134 is configured to overlay data or dimensional coordinates of the GeoJSON file on top of the data or dimensional coordinates of the SVG file, e.g., for the merged graphics layer 122. This overlay feature of the robust renderer 134 is related to the merged graphics layer 122 and intelligent analytics functions described earlier. More specifically, the robust renderer 134 can be used to execute the intelligent analytics and calculations related to spatial coordinates and bounds for respective coordinate systems of the SVG file and GeoJSON file. The robust renderer 134 allows for cooperation between, and integration of, different coordinate systems to allow for improved visualization (138) of data and graphical elements of drawing layers, e.g., when data for the merged graphics layer 122 is presented on the user interface 102.

When the merged graphics layer 122 includes an interactive GeoJSON layer and multiple image tiles, a tile renderer 136 can coordinate presentation of the GeoJSON layer with the image tiles. For instance, the tile renderer 136 can obtain x-y coordinates in computer-aided design ("CAD") screen space, e.g., for the user interface 102. The tile renderer 136 can use these coordinate to align the GeoJSON layer with the image tiles. For instance, the tile renderer 136 can convert coordinates for the GeoJSON layer into coordinates for the image tiles.

Figure 2:
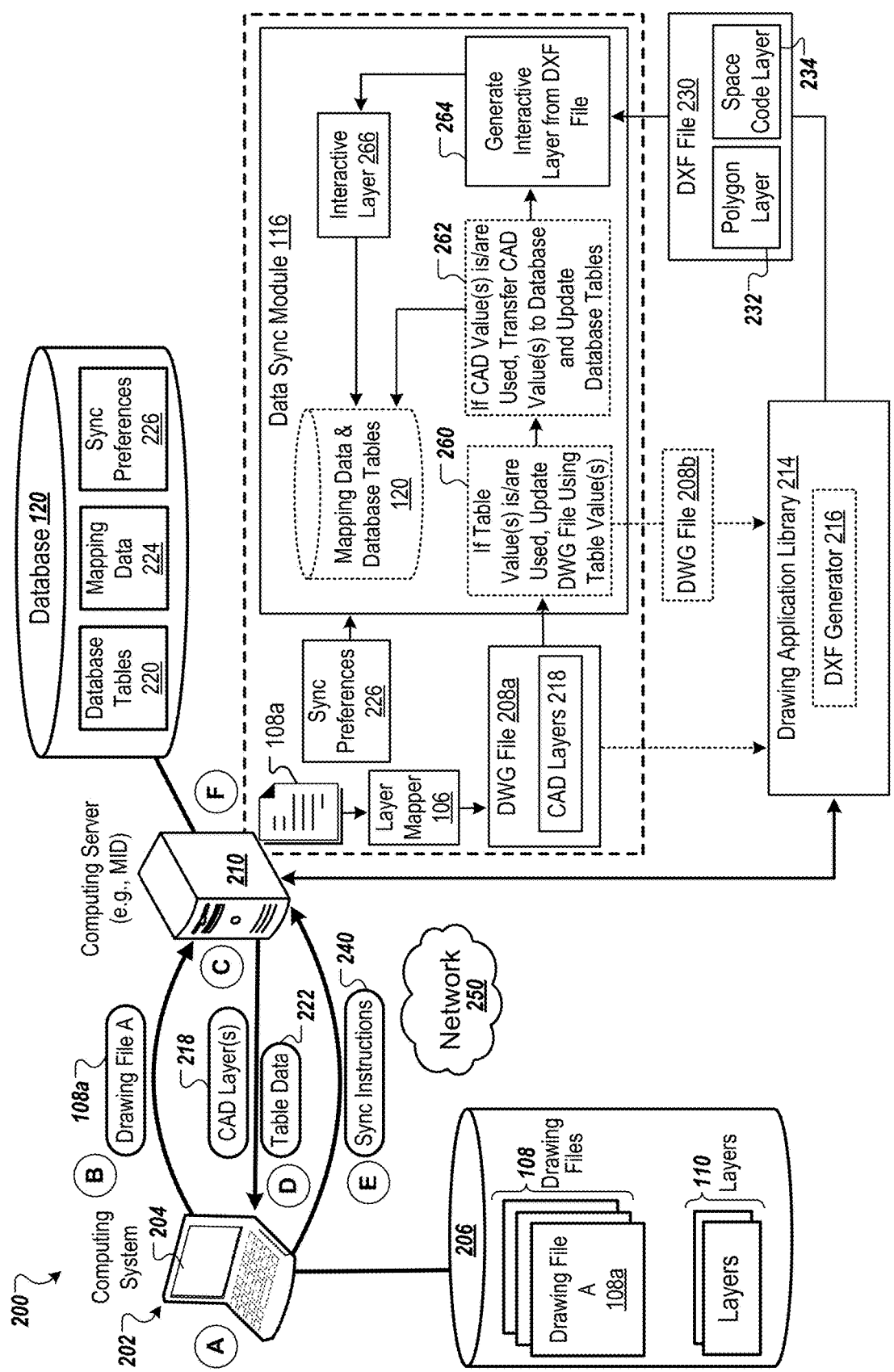
FIG. 2 illustrates an example computing system for performing a data sync operation.

FIG. 2 illustrates an example computing system 200 for performing a data sync operation. The system 200 may be, or may be part of, the computing system 100 described above with respect to FIG. 1. The system 200 includes a computing device 202 that can access the drawing files 108, and a computing server 210 that can access the database 120. The system 200 may also include a drawing application library 214. The computing device 202, the computing server 210, and the library 214 can communicate over a network 250. The computing server 210 can run the data sync module 116 to execute workflows for extracting data values from the drawing files 108, and for generating data structures used to stage or preview information linked to the drawing files 108. For example, the computing server 210 may extract data from layers identified in the mapping output corresponding to the drawing files 108, and proceed to generate data structures, such as an interactive layer linked to the groupings of layers in the mapping output corresponding to the drawing files 108.

The computing device 202 may be a computing device, such as a desktop computer with a display monitor, a laptop computer, a tablet device, a smartphone, a networked client/mobile device, or other related devices. The computing device 202 may be a client device that can be used to access the computing server 210. For example, the computing device 202 may be a workstation client, a mobile client, a web-based client, etc. The computing device 202 is operable to exchange data communications with other devices (e.g., client and server devices) of the system 200. For example, the computing device 202 is operable to communicate with the computing server 210 over the network 250. In some implementations, the computing device 202 is similarly operable to communicate with the drawing application library 214 over the network 250.

The computing device 202 includes a user interface 204. The user interface 204 may be, for example, a graphical user interface (GUI). As will be described in more detail below, the user interface 204 may be used to present certain data subsets to a user of the computing device 202. The user of the computing device 202 may interact with the computing device 202 through the user interface 204, through one or more sensor input devices (e.g., touchscreen, keyboard, microphone, mouse, etc.), or through a combination of the user interface 204 and one or more sensor input devices. In some implementations, the user interface 204 is the user interface 102 described above with respect to FIG. 1.

The computing device 202 also includes or otherwise has access to data storage 206. The data storage 206 may be locally stored on the computing device 202. The data storage 206 may be storage of a cloud computing platform that is accessible by the computing device 202. As illustrated, the data storage 206 may be used to store the drawing files 108 and their corresponding layers 110 described in more detail above with respect to FIG. 1.

The computing server 210 may include one or more computing devices. The computing server 210 may include, or be configured to operate, the data sync module 116 and/or the layer mapper 106. The computing server 210 may also include one or more other modules described above with respect to FIG. 1. For example, the computing server 210 may include, or be configured to operate, one or more of the audit module 114, the graphic sync module 118, the rendering module 130, and the tile renderer 136. The computing server 210 may communicate with the computing device 202 over the network 250 using, for example, one or more application programming interfaces (APIs) for communications. Similarly, the computing server 210 may communicate with the drawing application library 214 over the network 250 using, for example, one or more APIs for communications. The computing server 210 may be remote with respect to computing device 202 and/or the drawing application library 214. The computing server 210 may be part of a cloud computing platform. The computing server 210 may be part of another server system. For example, the computing server 210 may be a management, instrumentation, and discovery (MID) server.

The computing server 210 also includes the database 120 described in more detail above with respect to FIG. 1. The database 120 may be locally stored on the computing server 210. The database 120 may be storage of a cloud computing platform that is accessible by the computing server 210. As illustrated, the database 120 may be used to store database tables 220 and mapping data 224 described in more detail below. The database 120 may also store sync preferences 226.

The drawing application library 214 may be operable to convert drawing files into a different format. For example, the drawing application library 214 may be configured to convert DWG files to DXF files. The drawing application library 214 may include a DXF generator 216 that it uses to convert drawing files. The DXF generator 216 may perform one or more operations to convert drawing files. These operations may be part of a pre-programed workflow. The drawing application library 214 may be a third-party with respect to the computing server 210. For example, the drawing application library 214 may be part of a remote server system that the computing server 210 can communicate with using API calls for the drawing application library 214 stored in the database 120. In some implementations, the drawing application library 214 is part of the computing server 210.

The network 250 can include public and/or private networks and can include the Internet. The network 250 can include a cellular network.

In general, a management platform may refer to a system that integrates one or more computing devices and/or computing services. The management platform may also include or otherwise have the ability to access one or more databases, data stores, or cloud-based storages. The management platform can facility interactions between different users, and provide various services to users of the management platform.

As an example, a management platform may include the computing server 210 and the database 120. The management platform may include the computing system 202. The management platform may be able to facilitate interactions between users of the computing system 202, such as those working with the drawing files 108, and those users of the computing server 210 such as administrators. The management platform may be able to provide a number of services in the form of workflow modules, such as, for example, the layer mapper 106, the data sync module 116, the graphic sync module 118, etc.

In general, a computer design model may refer to a computer-aided design model. As an example, a computer design model may be a CAD model of one or more of the various possible file formats. In more detail, a computer design model may be a CAD file, such as a STEP file, a QIF file, a PDF file, a stereolithography (STL) file, an initial graphics exchange (IGES) file, an ACIS file, a Parasolid file, an additive manufacturing file, a Wavefront file, a 3D manufacturing format file, an Autodesk file, a Collada file, an X3D file, etc. The drawing file may be in a native CAD format. For example, the drawing file may be an AutoCAD file, a Blender file, a SolidWorks file, an Inventor file, or a SketchUp file. A computer design model may refer to the raw data that represents a real-world or virtual space, or to a visualization of the raw data. The computer design model may be or be interpreted to be a 2D representation or a 3D representation. A computer design model may have one or more model layers that correspond to particular data or data sets.

In general, a space element can refer to a data element of a drawing file. A space element may correspond to a real-world item. As an example, a space element can represent a particular room, wall, piece of furniture, elevator, set of stairs, outlet, fixture, electrical component, plumbing component, etc. A space element may be unique in that each space element can have a unique space code that can be used to identify the space element, and/or in that the space element may represent a particular real-world item. A space element may include one or more data components having corresponding data values. These data components may include, for example, a name for the space element, a unique space code (e.g., a unique numeric value for the drawing file, for the computing system that stores or created the drawing file, or for the entire CAFM system; a unique alphanumeric value for the drawing file or for the entire CAFM system, for the computing system that stores or created the drawing file, or for the entire CAFM system; etc.), one or more types or categories that the space element is associated with (e.g., a wall may be represented by a space element that is categorized as a structural component; a room may be represented as a space element that is categorized as a bathroom; etc.), a location (e.g., geospatial coordinates), one or more polylines that define the boundaries of the real-world item that the space element represents, etc. As will be discussed in more detail below, a layer mapping module may be configured to extract space elements and/or the data components of space elements from a drawing file, such as a CAD file.

FIG. 2 also illustrates a flow of data, shown as stages (A) to (E), with each representing a step in an example process. Stages (A) to (E) may occur in the illustrated sequence, or in a sequence that is different from the illustrated sequence. For example, some of the stages may occur concurrently. Additionally, there may be more or less stages than what is depicted.

In stage (A), a user of the computing device 202 (e.g., the user 104 shown in FIG. 1) may initiate data synchronization between at least part of at least one of the drawing files 108 and corresponding data of the computing server 210. The user may use the computing device to provide instructions to the computing server 210 to initiate data synchronization. As an example, the user may initiate data synchronization by interacting with the user interface 204. Specifically, the user may select an interface element of the user interface 204 that, when selected, generates instructions to fetch all or part of at least one of the drawings files 108 from the data storage 206, and transmit the fetched data to the computing server 210.

In initiating data synchronization, a user may provide parameters that are used to determine what data should be fetched from the data storage 206 and/or should be synchronized with corresponding data of the computing server 210. For example, the user may specify a building for data synchronization, a floor of a building for data synchronization, an area of a floor of a building for data synchronization, and/or specific items or types of items that should be used (or not used) for data synchronization. In more detail, a user may specify the $9^{th}$ floor of a particular office building should be used for data synchronization and that data related to all items should be synchronized except for data corresponding to security devices (e.g., security cameras) in the computer design model. In response, the computer device 202 may retrieve the drawing file 108a ("Drawing File A") from the data storage 206 before transmitting it to the computer server 210. The drawing file 108a may be a computer design model for the particular office building, or a computer design model for the $9^{th}$ floor of the particular office building.

In some implementations, in response to a user initiating data synchronization, all drawing files and/or out-of-date drawing files are used for data synchronization. For example, in response to a user indicating through the user interface that data synchronization should begin, the computing device 202 may fetch the most recent versions of all of the drawing files 108 and proceed to transmit them to the computing server 210 over the network 250.

In some implementations, the computing device 202 automatically determines what drawing files or parts of the drawing file should be used for data synchronization. The computing device 202 may compare a last synchronization time/date for the drawing files 108, a particular drawing file of the drawing files 108, or a particular portion of a drawing file of the drawing files 108 with corresponding last modified times/dates to identify what data should be fetched from the data storage 206 and transmitted to the computing server 210. For example, in response to a user initiating data synchronization, the computing device 202 may determine that the drawing file 108a was last synchronized two weeks ago but was recently modified two days ago. As such, the computing device 202 may automatically select the drawing file 108a for data synchronization and transmit it to the computing server 210.

In some implementations, data synchronization is initiated by the computing server 210. For example, the layer mapper 106 may automatically import the drawing files 108 from the data storage 206 and/or from the computing device 202 and automatically execute its layer mapping and data processing operations. The file storage location may be internal or external to the system 100.

In stage (B), the computing device 202 transmits one or more computer design models, or one or more portions of computer design models, to the computing server 210. For example, after retrieving the drawing file 108a from the data storage 206, the computing device 202 may transmit the drawing file 108a to the computing server 210 over the network 250.

The computing device 202 may transmit the one or more computer design models, or one or more portions of computer design models, with instructions for data synchronization. The instructions may be used by the computing server 210 to initiate data synchronization between the drawing file 108a and corresponding data in the database tables 220. The instructions may additionally or alternatively indicate specified parameters for synchronization. For example, the instructions may indicate a building for data synchronization, a floor of a building for data synchronization, an area of a floor of a building for data synchronization, and/or specific items or types of items that should be used (or not used) for data synchronization.

In some implementations, the computing device 202 transmits a portion of a computer design model. For example, the computing device 202 may transmit one or more layers of a subset of the layers 110 that correspond to the $9^{th}$ floor of the office building represented by the drawing file 108a. Here, the subset of the layers 110 may be all layers of the drawing file 108a.

In stage (C), the computing server 210 provides the received drawing file(s) to the layer mapper 106 to generate one or more CAD layers. For example, the computer server 210 may use the layer mapper 106 (e.g., perform one or more operations corresponding to the layer mapper 106 described in more detail above with respect to FIG. 1) to convert all or part of the drawing file 108a to a DWG file 208a and/or to generate CAD layers 218. Each of the CAD layers 218 can, for example, represent a floor of a building, an office on a particular floor of a building, a room or other defined area of the building (e.g., on a particular floor of the building), etc.

The CAD layers 218 may correspond to all or a portion of the drawing file 108a. For example, if the drawing file 108a is computer design model of a ten story building, there may be ten layers in the CAD layers 218 with each corresponding to a particular floor of the building. However, the layer mapper 106 may convert only part of the drawing file 108a in generating the DWG file 208a and/or the CAD layers 218. For example, based on instructions received from the computing device 202, the computing server 210 may instruct the layer mapper 106 to generate the DWG file 208a and/or the CAD layers 218 for only a portion of the drawing file 108a that corresponds to the 9th floor. Additionally or alternatively, the layer mapper 106 may filter out information of the drawing file 108a based on one or more mapping templates of mapping data 224. The mapping templates in the mapping data 224 may, for example, define protocols for aggregating sets of data values of the different layers corresponding to the drawing file 108a. For example, a mapping template in the mapping data 224 may indicate that only certain information needs to be extracted from the drawing file 108a and/or that only certain information extracted from the drawing file 108a needs to be used in generating the DWG file 208a and/or the CAD layers 218.

The information filtered out of the drawing file 108a may include, for example, superfluous information or ambiguous boundaries which can inhibit importation of data into the space management program. Other information that can be filtered out may include, for example, duplicate space codes, multiple space code per polyline, and/or overlapping polylines.

The layer mapper 106 can map portions of data extracted from the drawing file 108a to the corresponding CAFM layers (e.g., indicating each office on a floor) as defined by one or more mapping templates in the mapping data 224 to produce the grouping of CAD layers 218 corresponding to the drawing file 108a and/or to generate the DWG file 208a.

Specifically, the grouping of CAD layers 218 can, as an example, represent a group of offices on the 9th floor of a building along with each item of furniture in each office of the group. The layer mapper 106 may determine the mapping between the drawing layers in the drawing file 108a and the corresponding CAFM layers in the database tables 220 at least by processing data values of the different drawing layers (e.g., received inputs) against the protocols defined by the mapping template (e.g., in the mapping data 224) and with reference to any grouping preferences indicated by the user 104 or the space admin.

In some implementations, the CAD layers 218 are the CAD layers 112 described above with respect to FIG. 1. In some implementations, the CAD layers 218 are a subset of the CAD layers 112. The subset of the CAD layers 112 may be a subset of CAD layers corresponding to the drawing file 108a.

The layer mapper 106 may further identify a subset of data of the database tables 220 that correspond to the drawing file 108a. For example, the layer mapper 106 may identify a grouping of CAFM layers that represent the same building, floor, or other area as the drawing file 108a, or that represent an identified portion of the same building, floor, or other area as the drawing file 108a. The CAFM layers may be part of the database tables 220 and/or defined by one or more mapping templates in the mapping data 224. The layer mapper 106 may use the identified CAFM layers in generating table data 222, e.g., data corresponding to the DWG file 208a and/or the CAD layers 218 in that it represents CAFM version of the space and the DWG file 208a and/or the CAD layers 218 represent the computer system 202/client version of the space. For example, the table data 222 may include the data stored as part of the identified CAFM layers or extracted by the computing server 210 from the identified CAFM layers.

In some implementations, the layer mapper 106 outputs a file that is in a format other than DWG format. For example, the layer mapper 106 may output file that is in a different drawing file format, such as a STEP, IGES, parasolid, STL, VRML, X3D, COLLADA, or DXF format.

In stage (D), the computing server 210 retrieves data corresponding to the generated CAD layers, and transmits the data and at least a subset of the generated CAD layers or data extracted from the CAD layers to the computing device 202. That is, the computing server 210 may retrieve (e.g., extract) table data 222 from the database tables 220 that corresponds to the CAD layers 218. For example, where the CAD layers 218 correspond to the $9^{th}$ floor that has been identified for data synchronization, the computing server 210 may retrieve the table data 222 as a subset of the information in the database tables 220 that corresponds to the $9^{th}$ floor of the building. The computing server 210 may send this retrieved data along with the CAD layers 218 to the computing device 202 over the network 250. However, the computing server 210 may, in addition to or in place of sending the CAD layers 218, extract data from the CAD layers 218 and provide the extracted data along with the table data 222 to the computing device 202. The extracted data may include extracted space attribute values of multiple space elements, such as names of space elements, types of space elements that the space elements are categorized as, areas or locations corresponding to (e.g., that geospatially define or locate) the space elements, etc.

The extracted data may also include identifications of space elements. For example, each space element may have a unique code (e.g., numeric code, alphanumeric code, unique string, etc.) that identifies the space element. This unique identifier, also referred to as a Space Code, may be unique within the computer-aided design model (e.g., within the DWG file 208a and the table data 222), and/or unique across multiple drawing models (e.g., unique across the drawing files 108). In some implementations, the name of the space element may serve as an identifier of the space element. In some implementations, the name of the space element is used by more than one space element and cannot serve as an identifier of the space element.

Each data element (e.g., space element) in the computer-aided design model (e.g., in the DWG file 208a, in the table data 222, etc.) may correspond to a particular geospatial area. For example, a first space element may be a set of stairs in the computer-aided design model that corresponds to a first area on the $9^{th}$ floor of the building and is defined by a first set of polylines that outline this first area. A second space element may be an office that is adjacent to the set of stairs and that corresponds to a second area on the $9^{th}$ floor of the building. The office may be defined by a second set of polylines that outline this second area (e.g., four polylines that outline a rectangle corresponding to the office space element).

In some implementations, the computing server 210 generates a data object from the table data 222 and corresponding data extracted from the DWG file 208a (e.g., extracted from the CAD layers 218). For example, the computing server 210 may generate a table containing this data. This table may be the table depicted in the interface 300 described below with respect to FIG. 3. The computing server 210 may transmit this data object in addition to or in place of the table data 222 and/or the CAD layers 218.

The table data 222 may be organized based on the mapping data 224. For example, the table data 222 may organized in a hierarchy of CAFM layers that are defined by mapping protocols of the mapping data 224. The CAFM layers may be included in the mapping data 224.

The data in the database tables 220 may include, for example, identifiers for spaces (e.g., names and/or other identifiers for particular areas on the $9^{th}$ floor of the building, such as rooms, offices, or other spaces), indicators for the sizes and/or locations of spaces (e.g., parameters that define particular areas on the $9^{th}$ floor of the building, such as rooms, offices, or other spaces), types or categories of spaces (e.g., indications that a particular area is or corresponds to an office, a restroom, a conference room, stairs, etc.), items in the spaces (e.g., video cameras, chairs, desks, other furniture, etc.), and/or other space information. Accordingly, the table data 222 may also include these different types of data. Continuing the earlier example, the table data 222 may include the identifiers for all unique spaces on the $9^{th}$ floor of the building (e.g., as indicated in the database tables 220), an indication of the type of space for each of the unique spaces on the $9^{th}$ floor, and an indication of the items in each of the unique spaces on the $9^{th}$ floor.

In some implementations, the retrieval of the table data 222 is performed in the previous stage by the layer mapper 106.

In some implementations, one or more of the operations performed by the computer server 210 are performed by the computing device 202. For example, the operations corresponding to the layer mapper 106 may be performed by the computing device 202. That is, the computing device 202 may perform one or more workflows in order to convert the drawing file 108a (or a portion of the drawing file 108a such as a portion corresponding only to a particular floor of a building) to the DWG file 208a and/or generate the CAD layers 218 or the subset of CAD layers 218. In this example, the computing device 202 may request the table data 222 from the computing server 210 without having to transmit the drawing file 108a to the computing server 210. Instead, the computing device 202 may transmit the DWG file 208a, the CAD layers 218, and/or the subset of CAD layers 218 to the computing server 210 with the sync instructions 240.

In response to receiving the CAD layers 218 and the table data 222, the computing device 202 may present on the interface 204 data sync information. For example, as will be described in more detail below with respect to FIG. 3, the computing device 202 may present a data sync user interface 300 on the user interface 204. The data sync user interface 300 may include the table data 222 corresponding to the CAFM and corresponding data of the CAD layers 218 (e.g., extracted from the CAD layers 218). The information may be presented on the user interface 204 as a table such that the table is populated with both the table data 222 and the corresponding data of the CAD layers 218. The user interface 204 may provide a side by side comparison for different values of particular elements in the building (or other geographic location). For example, for a particular space element such as a set of stairs, the user interface 204 may present a first value obtained from the table data 222 (e.g., obtained from the database tables 220) next to a second, corresponding value obtained from the CAD layers 218 (e.g., generated from the drawing file 108a).

The information presented in the user interface 204 may indicate the existence of conflicts between values in the table data 222 and corresponding data of the CAD layers 218. For example, the user interface 204 may indicate when two values for a space element don't match. Similarly, the user interface 204 may indicate when there exists one value for an element (e.g., of the table data 222) but no corresponding value for the element (e.g., from the CAD layers 218). The interface 204 may also indicate the existence of matches between values in the table data 222 and corresponding data of the CAD layers 218.

The information presented in the interface 204 may also indicate preferences for synching data. These preferences may be predefined and part of, for example, sync preferences 226 of the database 120. The preferences may indicate how data conflicts that arise between the table data 222 and the CAD layers 218 should be resolved. Put another way, the preferences may indicate whether the CAD values or the CAFM values should be used. The preferences may be specific to particular space elements (e.g., CAFM value is used for Stairs 1 of the $9^{th}$ floor of Building A), particular types of space elements (e.g., CAD values are used for all office type spaces), to particular spaces (e.g., CAD values are used for Building A; CAFM values are used for Sports Complex B; CAD values are used for $8^{th}$ floor of Building A; CAFM values are used for $9^{th}$ floor of Building A; etc.). The preferences may also indicate that certain values, values of elements, values of types of space elements, etc. should not be updated. For example, the preferences may indicate for a space element corresponding to a first set of stairs that no action should be taken with respect to updating the values. This would have the effect of leaving the CAD value the same and the CAFM value the same, even if they, for example, did not match.

The user 104 may interact with the interface 204 to update information. For example, the user 104 may interact with the interface 204 to update preferences (e.g., indicating whether the CAD value or CAFM value should be used for a particular space element, or feature of a space element), and/or updates to CAD and/or CAFM values (e.g., updates to an identifier for a space element, a name for a space element, a type for a space element, etc.).

The user 104 may also interact with the interface 204 to generate the sync instructions 240. For example, the user 104 may indicate through the interface 204 that the data sync should start (or continue). Specifically, the user 104 may, for example, select an interface element corresponding to a data sync start instruction. In response to this interaction, the computing device 202 may generate the sync instructions 240.

In some implementations, the sync instructions 240 include updates made to field values. These updates may include updates that need to be made to the CAD layers 218 and/or updates to the table data 222. In response to receiving an indication of these manual updates to the CAD layers 218 and/or the table data 222, the computer server 210 may update the CAD layers 218 and/or the database tables 220 respectively. Alternatively, the computing device 202 may make these updates to the CAD layers 218 and/or to the table data 222 and send the updated table data 222 and/or the updated CAD layers 218 to the computing server 210. The computing server 210 may update the database tables 220 based on the updated table data 222.

The updates may also or alternatively include updates to preferences, e.g., as to whether the CAD value or the CAFM value for a given field should be used (or if no action should be performed). These changes to the preferences may be sent to the computing server 210. The computing server 210 may update the sync preferences 226 accordingly to reflect the updates, e.g., made by the user 104. The computing server 210 may associate the updated preferences with the specific user who made the updates (e.g., the user 104) and/or with the computing system where the updates were made (e.g., the computing device 202).

In stage (E), the computing device 202 transmits the sync instructions 240 to the computing server 210. For example, the computing device 202 may transmit the sync instructions 240 to the computing server 210 over the network 250 as a data packet that the computing server 210 is configured to extract the contents of. In response to receiving the sync instructions 240, the computing server may continue the data sync process using the data sync module 116.

As described above, the sync instructions 240 may also include instructions to update information. The computing server 210 may, in accordance with the sync instructions 240, update the database tables 220 (e.g., for updates made to CAFM values), or update of the sync preferences (e.g., for updates made to preferences, such as whether the CAFM value is preferred, the CAD value is preferred, or if neither is preferred). Where the sync instructions 240 include instructions to update the CAD data, the computing server 210 may update the CAD layers 218 or generate new CAD layers. In some implementations, these updates are made prior to using the data sync module 116 to perform data sync operations.

In stage (F), the computing server 210 uses the data sync module 116 to complete data synchronization. In general, the data sync module 116 executes an example workflow for extracting data values from the CAD layers 218 and for generating data structures used to stage or preview information linked to the CAD layers 218. The extracted data values may correspond to different space attributes of different space elements. For example, the extracted data values may include, for example, values that indicate space element identifications, types, areas, locations, names, etc. After extracting these data values, the data sync module 116 may compare the extracted data values to corresponding data in the database tables 220. For example, the data sync module 116 may compare the values extracted from the CAD layers 218 to the table data 222. The data sync module 116 may use the results of the comparison to update the drawing file 108a and/or the database tables 220.

In response to receiving the sync instructions 240, the computing server 210 can provide the DWG file 208a to a drawing application library 214. The library 214 may be a third party with respect to the computing server 210 library which can be used to convert drawing files from a first format to a second format. For example, the library 214 may be used to convert DWG format drawing files to DXF format drawing files. In some implementations, the library 214 is not a third party. For example, the library 214 may be part of the computing server 210 and/or maintained by the computing server 210.

The computing server 210 may communicate with the library 214 using API calls, e.g., provided by the library 214. The API calls may be embedded with CAD plugin software.

The library 214 may include a DXF generator 216. The DXF generator 216 may be, for example, a software module that executes one or more workflows to convert a DWG file to a corresponding DXF file. For example, in response to receiving the DWG file 208a having CAD layers 218, the library 214 may use the DXF generator 216 to generate a DXF file 230 form the DWG file 208a (or an updated DWG file 208b described in more detail below). The DXF file 230 may include a polygon layer 232 and a space code layer 234. The polygon layer 232 may include multiple polygons (e.g., that are each formed by a set of polylines) that each correspond to a particular area and space element. For example, a polygon in the polygon layer 232 may correspond to an area that defines a first bathroom on the $9^{th}$ floor of a building, a set of stairs on the $9^{th}$ floor of the building, a desk in an office on the $9^{th}$ floor of the building, etc. In contrast, the space code layer 234 may include various attribute values. For example, the space code layer 234 may include the names of space elements, the types of elements that the space elements are categorized as, etc. In some implementations, the space code layer 234 may also include an indication of the areas of the space elements and/or locations of the space elements, such as coordinates that define an area for the space element.

In some implementations, the generator 216 is able to convert different drawing file types. For example, the generator 216 may be able to receive drawing files in a different format than DWG and convert those file into a DXF format. Similarly, the generator 216 may be able to generate drawing files in a format different from DXF. For example, in response to receiving the DWG file 208a, the library 214 may use the generator 216 or a different generator to convert the DWG file 208a into a format other than DWG or DXF file format.

Alternatively, in response to receiving the instructions 240, the data sync module 116 can perform an operation 260 to update the DWG file 208a using data from the database tables 220. For example, if the sync preferences 226 and/or the sync instructions 240 indicate that the CAFM value for a space attribute is preferred over the corresponding CAD value, the data sync module 116 may update the DWG file 208a using the CAFM value from the database tables 220 (e.g., that may have been included in the table data 222). The data sync module 116 may refer to the sync preferences 226 in determining which space elements and attributes of space elements need to be updated. For example, the data sync module 116 will only update the values corresponding to space elements and/or specific space attributes where the sync preferences 226 indicate that the CAFM value should be used (e.g., over the CAD value). The data sync module 116 may limit making updates to only those space element and/or attribute values where a conflict between the CAFM value and corresponding CAD value was previously identified (e.g., that may have resulted in the computing server 210 or the computing device 202 issuing a warning or error).

In performing the operation 260, the data sync module 116 may check each space element and/or corresponding space attributes in the CAD layers 218 to determine if updates to the corresponding values are required.

The data sync module 116 produces an updated DWG file 208b as a result of updating the DWG file 208a. In producing the DWG file 208b, the data sync module 116 may, for example, update each space value in the DWG file 208a where the sync preferences 226 indicate that the CAFM value should be used and where it was previously determined that the CAFM value for the space value does not matching the CAD value for the space value.

After the DWG file 208b is produced, the computing server 210 can transmit the DWG file 208b to the library 214. The library 214 may use the DXF generator 216 to generate the DXF file 230 from the DWG file 208b.

The data sync module 116 can perform an operation 262 to update the database tables 220 using CAD values (e.g., values extracted by the data sync module 116 from the DWG file 208a and/or the CAD layers 218). For example, if the sync preferences 226 and/or the sync instructions 240 indicate that the CAD value for a space attribute is preferred over the corresponding CAFM value, the data sync module 116 may transfer the CAD value to the database 120 to update the database tables 220. The data sync module 116 may refer to the sync preferences 226 in determining which space elements and attributes of space elements need to be updated. For example, the data sync module 116 will only update the values corresponding to space elements and/or specific space attributes where the sync preferences 226 indicate that the CAD should be used (e.g., over the CAFM value). The data sync module 116 may limit making updates to only those space element and/or attribute values where a conflict between the CAFM value and corresponding CAD value was previously identified (e.g., that may have resulted in the computing server 210 or the computing device 202 issuing a warning or error).

The data sync module 116 may perform an operation 264 to generate an interactive layer 266 from the DXF file 230. For example, the computing server 210 may receive the DXF file 230 from the library 214 over the network 250. The computing server 210 may provide the DXF file 230 as input to the data sync module 116. In response to receiving the DXF file 230, the data sync module 116 (e.g., as part of the operation 264) may parse the DXF file 230 in order to create required metadata and/or to identify the polygon layer 232 and the space code layer 234, translate the polygon layer 232 and the space code layer 234 into the interactive layer 266, and transfer the interactive layer 266 to the database 120 to update the database tables 220.

In performing the operation 264, the data sync module 116 may use one or more algorithms, such as one or more static or machine learning algorithms. The data sync module 116 may use the one or more algorithms to generate the interactive layer 266 form the polygon layer 232 and the space code layer 234. For example, the data sync module 116 may use the one or more algorithms to translate the DXF file 230 by matching space codes in the space code layer 234 to corresponding polygons in the polygon layer 232.

The interactive layer 266 may be a data layer that provides a way to visualize and structure data sets, e.g., corresponding to the drawing file 108a. The interactive layer 266 may be a GeoJSON file.

Although many of the examples are described above with respect to a building, one or more of the drawing files 108, the DWG file 208a, the DWG file 208b, and the DXF file 230 may represent other types of spaces. For example, the drawing file 108a may define a physical layout of a region, campus, site, or floor of a geographic location.

FIG. 3 illustrates an example user interface 300 for performing a data sync operation. The interface 300 (e.g., data sync interface) may be presented on the user interface 204 of the computing device 202. The interface 300 may, for example, include a table that is populated by the computing device 202 with CAD data and corresponding CAFM data. That is, for example, the interface 300 may display a table containing data in or extracted from the CAD layers 218 and the table data 222 from the database tables 220 as described above with respect to FIG. 2. The interface 300 may provide a side by side comparison for different values of particular elements in the building (or other geographic location). For example, for a particular space element such as a set of stairs (e.g., Space Code: 153), the interface 300 may present a first value corresponding to the CAFM data (e.g., obtained from the table data 222) and a corresponding CAD value (e.g., obtained from the CAD layers 218). Although the CAD and CAFM data is presented in a table, the interface 300 may display this information in one or more other layouts/formats.

The information presented in the interface 300 may indicate identified errors or warnings, e.g., identified by the computing device 202 or previously identified by the computing server 210 conflicts. For example, the computing device 202 may display on the interface 300 the existence of conflicts between CAFM values and corresponding CAD values, e.g., based on values in the table data 222 and corresponding values extracted from the CAD layers 218. For example, the interface 300 may indicate when two values for a space element do not match. Similarly, the interface 300 may indicate when there exists one value for an element (e.g., of the table data 222) but no corresponding value for the element (e.g., from the CAD layers 218). Additionally or alternatively, the interface 300 may indicate the existence of matches between values in the table data 222 and corresponding data of the CAD layers 218.

The information presented in the interface 300 may also indicate preferences for synching data. These preferences may be predefined and part of, for example, sync preferences 226 of the database 120. The preferences may indicate how data conflicts that arise between the CAD data (e.g., the CAD layers 218) and the CAFM data (e.g., the table data 222) should be resolved. Put another way, the preferences may indicate whether the CAD values or the CAFM values should be used. The preferences may be specific to particular space elements (e.g., CAFM value is used for Stairs 1 of the $9^{th}$ floor of Building A), particular types of space elements (e.g., CAD values are used for all office type spaces), to particular spaces (e.g., CAD values are used for Building A; CAFM values are used for Sports Complex B; CAD values are used for $8^{th}$ floor of Building A; CAFM values are used for $9^{th}$ floor of Building A; etc.). The preferences may also indicate that certain values, values of elements, values of types of space elements, etc. should not be updated. For example, the preferences may indicate for a space element corresponding to a first set of stairs that no action should be taken with respect to updating the values. This would have the effect of leaving the CAD value the same and the CAFM value the same, even if they, for example, did not match.

The interface 300 may indicate warnings or errors that have been detected, e.g., by the computer system 202. The warnings or errors may indicate when mismatched values have been detected or when missing value have been detected. The warnings or errors may also or alternatively indicate a field has an incorrect or otherwise impermissible value. For example, the computer system 202 may generate a warning when a field requires a numerical value but contains one or more string characters. As another example, the computer system 202 may generate warning when a field includes a value that does not match one or more predetermined and permitted values, or includes a value that is specific to one or more other fields or other types of fields. As shown, the computer system 202 may generate an error for the stairs space element (Space Code: 153) due to the CAD value of the space type field being "STAIR", which is not a permitted value for this field and/or this value can only be used for the space name field.

When an error or warning is detected and/or generated, the computing server 210 may visually distinguishing the field associated with the error or warning from other fields in the interface 300. For example, in response to determining that the CAD value "STAIR" for the space type attribute of the stairs space element (Space Code: 153) is invalid, the computing server 210 may bold the value (e.g., bold the field that contains the value) to visually distinguish it from other values that are not associated with an error or warning. The values and/or corresponding fields that are associated with the errors or warnings may be distinguished in other ways. For example, the computing server 210 may highlight the value, may strikethrough the value, may apply a shade to the field that contains the value, underline the value, may display the value in a different color (e.g., "STAIR" CAD value is displayed in red while other values are displayed in black), etc.

As another example, the computing server 210 may bold both the CAD value "Work Room" and the CAFM value "Office" for the space element having space code "302" in response to determining that the pair of values do not match. Because the preferences indicate that the CAFM value has priority, the computing server 210 may issue a warning since the conflict will be resolved by replacing the CAD value with the CAFM value (e.g., as opposed to an error, unless the CAFM value is invalid or some other error is identified).

The interface 300 may include a search bar 302 having a search interface element ("Search"). The user 104 may use the search bar 302 to search and find specific space elements. The search bar 302 may allow the user to search by space name, space type, space code (e.g., the identifier for a particular space element), etc. The user 104 can initiate the search by inputting a string (e.g., using a keyboard, or a microphone and speech-to-text software) and selecting the corresponding search interface element.

The interface 300 may allow for filtering of the space elements. For example, the user 104 can interact with the interface 300 to limit the display of space elements to particular space names, space types, CAFM areas, etc.

The user 104 may interact with the interface 300 to make updates. For example, the user 104 may interact with the user interface 204 to modify one or more values, such as a space name for a space element. The user 104 may also or alternatively interact with the interface 300 to update preferences. For example, the user 104 may interface with one of the fields in the "Action" column to change the preference with respect to that space element feature. Specifically, the user 104 may select "Use CAD Value" in the first row corresponding to the stairs space element (Space Code: 153). In response, the computer system 202 may present a drop-down menu providing a first option of "Use CAD Value", a second option of "Use CAFM Value", and a third option of "No Action" (e.g., so that CAD values will not be updated using the CAFM values and vice versa).

The user 104 may interact with the interface 300 to continue the data sync process. For example, after reviewing the information presented in the interface 300 and/or after making one or more updates, the user 104 may select the interface element 304. In response, the computer system 202 may generate the sync instructions 240 described above with respect to FIG. 2.

Figure 4:
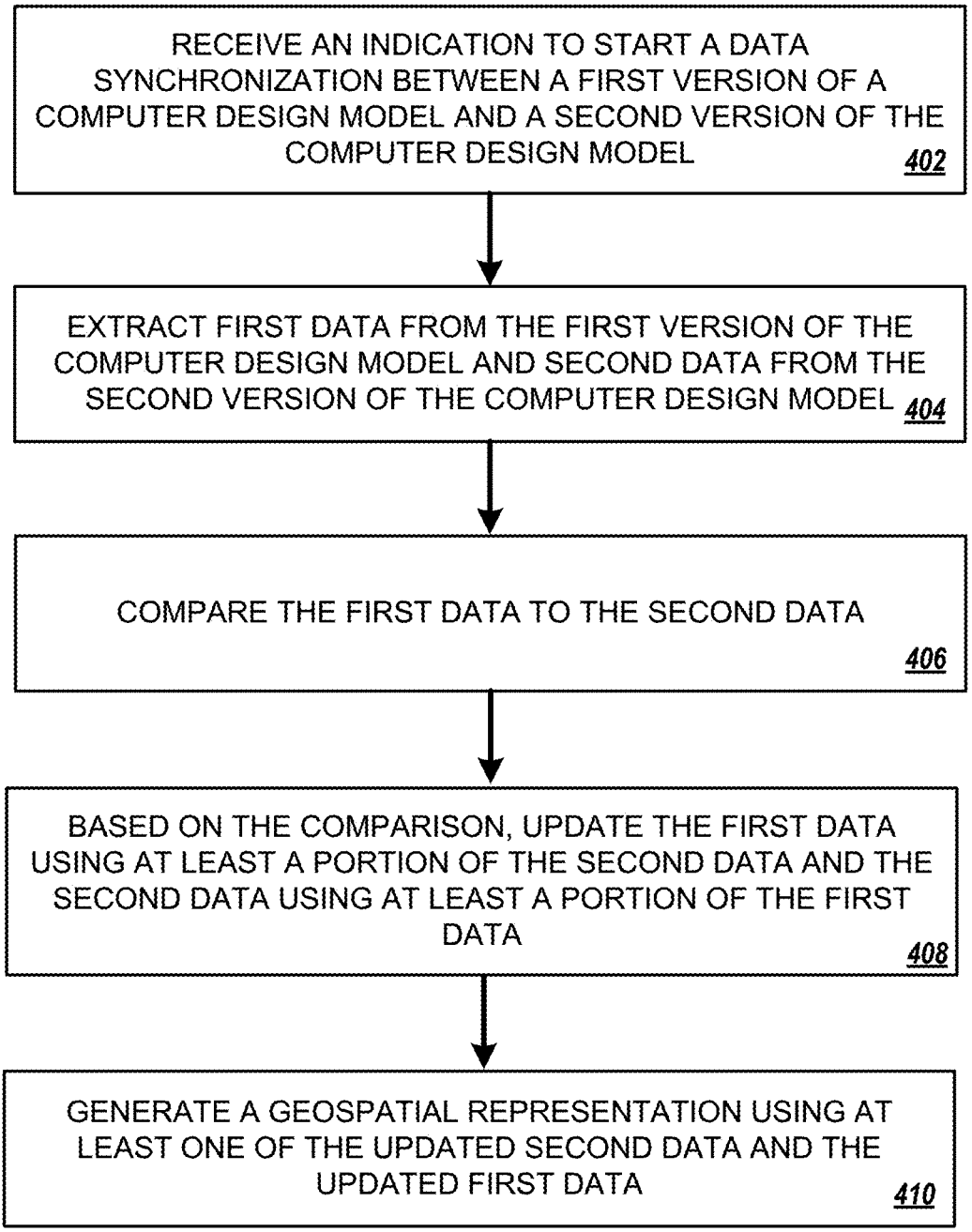
FIG. 4 illustrates an example process for performing a data sync operation.

FIG. 4 is an example process 400 for performing a data sync operation. The process 400 may be performed by the computing server 210 shown in FIG. 2. Specifically, all or part of the process 400 may be performed by the data sync module 116 of computing server 210. The process 400 includes receiving an indication to start a data synchronization between a first version of a computer design model and a second version of the computer design model (402). For example, with respect to FIG. 2, receiving an indication to start data synchronization may include the computing server 210 receiving the drawing file 108*a* or a subset of corresponding CAD layers from the layers 110. The drawing file may be obtained from a remote computing system or database, or sent by a remote computing system. As another example, receiving an indication may include receiving the synchronization instructions 240 from the computing device 202, where the synchronization instructions 240 indicate that data synchronization should occur between the DWG file 208*a* (e.g., generated from the drawing file 108*a*) and the corresponding table data 222 (e.g., a subset of the database tables 220). With respect to FIG. 3, an indication to start data synchronization may be generated in response to a user selecting the interface element 304 in the interface 300.

The first version of the computer design model may be, for example, a drawing file such as a CAD file. For example, with respect to FIG. 2, the first version of the computer design model may be the drawing file 108*a*. The first version of the computer design model may also refer to, for example, a drawing file or drawing layers produced by the layer mapper 106 (e.g., extracted from the drawing file 108*a*). For example, the first version of the computer design model may be the DWG file 208*a* that may have had non-relevant or undesirable information in the drawing file 108*a* filtered out prior to synchronization.

Accordingly, the first version of the computer design model may be stored on a device (e.g., the drawing file 108*a* stored on the computing device 202) or extracted from a file stored on the device (e.g., the DWG file 208*a* and/or the CAD layers 218 extracted from the drawing file 108*a* by the layer mapper 106).

The second version of the computer design model may be, for example, CAFM layers stored among database tables. For example, with respect to FIG. 2, the second version of the computer design model may be a subset of the database tables 220 in the database 120. The mapping data 224 may indicate how the database tables 220 correspond to the drawing files 108, e.g., and, therefore, may be used to identify the second version of the computer design model from among the database tables 220.

The process 400 includes extracting first data from the first version of the computer design model and second data from the second version of the computer design model (404). For example, the computing server 210 may extract space attribute values of the space elements from the CAD layers 218 of the DWG file 208*a*. Similarly, the computing server 210 may extract from the database tables 220 a subset of data, e.g., the table data 222, corresponding to the drawing file 108*a* and/or the CAD layers 218. The extracted data may include space attribute values, such as space element names, space element types, space element areas or locations, etc. The extracted data may also include identifiers for the space elements, such as space codes.

In some implementations, the extracted first data and the extracted second data are transmitted to a remote electronic device for display. For example, the computing server 210 may transmit the extracted first data and the extracted second data to the computing device 202. The computing device 202 may use the data to generate the interface 300 that is displayed to the user 104.

In some implementations, a data object is generated using the first data and the second data, and the data object is transmitted to a remote electronic device. For example, the computing server 210 may generate a table using the first data extracted from the CAD layers 218 and the second data retrieved from the database tables 220. The computing server 210 may transmit this table to the computing device 202.

The process 400 includes comparing the first data to the second data (406). For example, with respect to FIG. 2, the data sync module 116 may compare for different data elements the CAD values with the corresponding values of the database tables 220. In performing the comparison, the data sync module 116 may identify conflicts between the different sets of values and/or determine how those conflicts should be resolved. For example, the data sync module 116 may determine whether the values match or do not match. If the values match, the data sync module 116 may determine that no updates need to be made to the drawing file for this value during the performance of the operation 260 and, similarly, that no updates need to be made to the database tables 220 for this value during the performance of the operation 262. However, if the values do not match, the data sync module 116 may determine for a set of corresponding values whether the CAD value or the table value should be used (e.g., used to update the DWG file 208a or the database tables 220). To make this determination, the data sync module 116 may refer to the sync preferences 226. For example, in comparing the first data to the second data, the data sync module 116 may refer to the sync preferences 226 to determine for different sets values whether the CAD value has priority, the CAFM value has priority, or that neither value has priority (e.g., in which case no data synchronization is performed with respect to that set of values).

In some implementations, comparing the first data to the second data includes analyzing one or more values in at least one of the first data or the second data to identify errors. For example, the computing server 210, e.g., through the data sync module 116, may determine that a value corresponding to a particular data element (e.g., an attribute value for the data element) is invalid. The data sync module 116 may determine that a value is invalid if it above a particular threshold, is below a particular threshold, outside of a permitted range of values, is exclusive to another data element, is exclusive to another type of data element, is exclusive to a specific attribute, is specific to a type of attribute, is assigned to (e.g., used by) another data element, is assigned to (e.g., used by) another attribute of the same data element or a different data element, etc. For example, with respect to FIG. 3, the data sync module 116 may determine that the CAD value of "STAIR" is invalid for the Space Type attribute of the data element Space Code: 153 because (i) this value is already used by the Space Name attribute, (ii) this value is exclusive to the Space Name attribute for this particular data element, and/or (iii) this value is exclusive to the Space Name attribute type (e.g., for multiple and/or different data elements).

In some implementations, comparing the first data to the second data includes determining that a second portion of the first data is incomplete, and based on the second portion of the first data being incomplete, determining that a portion of the second data corresponding to the second portion of the first data should be used to update the first data. Updating the first data using at least the portion of the second data may include updating the first data using the portion of the second data corresponding to the second portion of the first data that is incomplete. For example, with respect to FIGS. 2-3, in comparing the two sets of data, the data sync module 116 of the computing server 210 may determine that there is no CAFM value for the space name attribute of the corridor space element (Space Code: 301). Based on this, the data sync module 116 may determine that the existing CAD value of "CORRIDOR" should be used to update the incomplete CAFM value (e.g., the missing value). In some implementations, the data sync module 116 may use the value that does not have priority to update the value the priority value if the priority value is incomplete or missing. In some implementations, the data sync module 116 may not perform data synchronization with respect to a pair or set of values if the value that has priority is incomplete or missing (e.g., the action is set to "no action"). In some implementations, the data sync module 116 updates the sync preferences 226 for a particular geospatial area (e.g., space element) to indicate that a valid and/or complete value has priority over an incomplete (e.g., missing) value. This may be the case even if the incomplete value was previously prioritized.

Missing value may also be referred to as a null value. Similarly, an incomplete value may also be referred to as a null value.

The process 400 include updating the first data using at least a portion of the second data or the second data using at least a portion of the first data (408). With respect to FIG. 2, the data sync module 116 may perform the operation 260 to update the DWG file 208a if the results of the comparison (e.g., based on the sync preferences 226) indicate that one or more table values (e.g., one or more CAFM values) corresponding to particular space attributes have priority over the corresponding CAD values. The data sync module 116 may proceed to produce the updated DWG file 208b as a result of updating the DWG file 208a to include one or more values in the database tables 220. Similarly, the data sync module 116 may perform the operation 262 to update the database tables 220 if the results of the comparison (e.g., based on the sync preferences 226) indicate that one or more CAD values (e.g., in the CAD layers 218) corresponding to particular space attributes have priority over the corresponding table values. The data sync module 116 may proceed to update the database tables 220 using the preferred CAD values found in the CAD layers 218.

In some implementations, the first data is updated using at least a portion of the second data and the second data is updated using at least a portion of the first data. For example, with respect to FIGS. 2-3, during data synchronization the data sync module 116 may update the database tables 220 using the CAD values for the stairs data element (Space Code: 153) and the CAFM values for the office data element (Space Code: 302) in line with the preferences indicated in the interface 300 (e.g., set by an administrator, set by the user 104, set by the computing server 210, etc.).

In some implementations, where an error is identified for a first value and no error is identified for a corresponding second value, the second value is used to update the first value. This may be the case even if the preferences indicate that the first value has priority over the second value. For example, with respect to FIGS. 2-3, if the data sync module 116 determines that the value "Office" is invalid for the Space Name attribute of the data element Space Code: 302 but that the value "Work Room" is acceptable for the Space Name attribute, the data sync module 116 may use the CAD value of "Work Room" to update the database tables 220 even though the CAFM value has priority since the CAFM value is invalid. Alternatively, the data sync module 116 may alert an administrator of the invalid value with a recommendation to use the CAD value. The data sync module 116 may wait until it receives a confirmation to update the database tables 220, or receives instructions to modify the CAFM value (e.g., to an acceptable value).

In some implementations, where an error is identified for a first value and no error is identified for a corresponding second value, neither the first value nor the second value are updated. This may be the case only when the preferences indicate that the first value has priority over the second value. Alternatively, this may be the case regardless of which value, if any, the preferences indicate is preferred. For example, with respect to FIGS. 2-3, if the data sync module 116 determines that the value "Office" is invalid for the Space Name attribute of the data element Space Code: 302 but that the value "Work Room" is acceptable for the Space Name attribute, the data sync module 116 may determine to perform no synchronization actions with respect to this value. That is, the data sync module 116 may determine that neither the first value in the database tables 220 nor the second value in the DWG file 208*a* should be updated.

In some implementations, where an error is identified for a first value and the first value has priority over a second value, the preferences for the value are updated. The preferences may be updated by the data sync module 116 to indicate that the second value now has priority. Alternatively, the preferences may be update by the data sync module 116 to indicate that no synchronization action should take place with respect to that value (e.g., that the value in the DWG file 208*a* and the corresponding value in the database tables 220 should not be updated).

In some implementations, where a geospatial area is missing from the first data or the second data, the geospatial area is added to second data or the first data respectively. For example, if the DWG file 208*a* indicates that a new office was added to the 9$^{th}$ floor of the building represented by the DWG file 208*a* and the table data 222 does not include such a space element (or a conflicting space element, or a conflicting space element that has priority over the new office as indicated by the sync preferences 226), the data sync module 116 may, in performing the operation 262, add the new space element and its attribute values to the database tables 220.

The process 400 includes generate a geospatial representation using at least one of the updated second data and the updated first data (410). For example, with respect to FIG. 2, the data sync module 116 may generate the interactive layer 266 from the DXF file 230. The DXF file 230 may be generated from the DWG file 208*a*, e.g., which would reflect the updated second data when all of the CAD values are preferred over the corresponding CAFM values. Similarly, the DXF file 230 may be generated from the DWG file 208*b*, e.g., which would reflect the updated first data when all or a portion of the CAFM values are preferred over corresponding CAD values.

The interactive layer may be, for example, in a format for encoding geographic data structures such as GeoJSON, which is standardized by RFC 7946 of the Internet Engineering Task Force (IETF).

In some implementations, generating the geospatial representation includes extracting a polygon layer from the computer design model. As an example, with respect to FIG. 2, extracting the polygon layer may include extracting the polygon layer 232 from the DXF file 230. The polygon layer may include multiple polygons (e.g., each formed by a set of polylines) that correspond to representations of geospatial areas, such as space elements, in the computer design model. For example, the polygon layer 232 may include a first polygon that corresponds to a bathroom space element, a second polygon that corresponds to a stairs space element, a third polygon that corresponds to an office space element, a fourth polygon that corresponds to a desk space element (e.g., that is within the third polygon), etc. Each polygon in the polygon layer may correspond to a particular geospatial area (e.g., defined by the respective polygon) and space element.

In some implementations, each polygon in the polygon layer is associated with an identifier for a corresponding geospatial area. For example, each polygon in the polygon layer may be tagged with a unique space code that corresponds to a particular space element.

In some implementations, generating the geospatial representation includes extracting a geospatial identification layer from the computer design model. For example, with respect to FIG. 2, the data sync module 116 may extract the space code layer 234 from the DXF file 230. The geospatial identification layer may include multiple identifications that correspond to the representations of geospatial areas, such as the space elements, in the computer design model. For example, the space code layer 234 may include various space codes and their corresponding space attribute values. In more detail, the space code layer 234 may include, for each space element, the space code (e.g., identifier) for the space element, the names of space element, the type of space element, other metadata associated with the space element (e.g., name of location where space element is located, name of building where the space element is located, floor of building where the space element is located, etc.), etc. In some implementations, the space code layer 234 may also include an indication of the areas of the space elements and/or locations of the space elements, such as coordinates that define an area for the space element, or a geospatial center for the space element.

In some implementations, generating the geospatial representation includes iteratively matching the polygons in the polygon layer with corresponding identifications in the geospatial identification layer. For example, with respect to FIG. 2, in generating the interactive layer 266, the data sync module 116 may iteratively match sets of polylines in the extracted polygon layer 232 to corresponding values (e.g., attribute values) by matching the space code that each set of polylines (e.g., each polygon) is tagged with to the space code that the values are associated with. In this way, the values of a space element can be matched with the geospatial area of the space element.

In some implementations, matching the polygons in the polygon layer with the corresponding identifications in the geospatial identification layer may include determining for each polygon and identification pair that a geospatial area corresponds to both the polygon and identification such that a location associated with identification is bounded by its corresponding polygon. For example, generating the geospatial representation may include iteratively matching the polygons in the polygon layer with corresponding geospatial centers in the geospatial identification layer. In more detail, in generating the interactive layer 266, the data sync module 116 may iteratively match sets of polylines in the extracted polygon layer 232 to corresponding values (e.g., attribute values) by determining that set of polylines encompass corresponding geographic centers in the values (e.g., attribute values of the space code layer 234). Additionally or alternatively, in generating the interactive layer 266, the data sync module 116 may iteratively match sets of polylines in the extracted polygon layer 232 to corresponding values (e.g., attribute values) by (i) using the polylines to calculate geographic centers for each set of polylines and (ii) matching the calculated geographic centers to geographic centers in the values (e.g., attribute values of the space code layer 234). In this way, the values of a space element can be matched with the geospatial area of the space element. In this way, the values of a space element can be matched with the geospatial area of the space element.

The process 400 can include receiving input indicating a modification to the second version of the computer design model. The modification may be, for example, a modification to an attribute corresponding to the computer design model (e.g., a modification to a space attribute value of a space element), an addition of an attribute corresponding to the computer design model (an addition of a new space attribute to a space element, or an addition of a new space attribute and corresponding value to a space element), a removal of an attribute corresponding to the computer design model (e.g., a removal of a space attribute from a space element), etc. The modification may additionally or alternatively include the addition of a new geospatial area (e.g., space element) to the second version of the computer design model, or the removal of an existing geospatial area (e.g., space element) from the second version of the computer design model. The modification may additionally or alternatively include the modification to the preferences for a particular geospatial area or attribute. In response to a modification to the preferences, the computing server 210 may update the sync preferences 226 in accordance with the modification.

As an example, with respect to FIGS. 2-3, the computer device 202 may present the user interface 300. A user or an administrator may use the user interface 300 to update one or more CAFM values of space attributes, to remove one or more space elements, to add one or more space elements, to update the preferences (e.g., the "action") for one or more space attributes, etc. In response to a CAFM value update, the data sync module 116 may update the database tables 220 in accordance with the update.

In some implementations, updating the first data using at least the portion of the second data may include updating the first data to reflect the modification to the second version of the computer design model.

In some implementations, the attribute is an identification of a geospatial area. For example, the attribute may be a space code associated with a particular space element. In some implementations, the attribute is a location of a geospatial area. For example, the attribute (e.g., attribute value) may be geographic coordinates that correspond to a geometric center of a space element.

In some implementations, the attribute is one or more shapes that describe bounds of a geospatial area. For example, the attribute (e.g., attribute value) may be a set of polylines that make up a polygon that defines the bounds of a space element.

In some implementations, the attribute is a type of geospatial area. For example, the attribute (e.g., attribute value) may be a particular space type from a list of possible space types, where the attribute value is associated with a particular space element. The possible space types may include, for example, a restroom type, an office type, a stairs type, an elevator type, a furniture type, an equipment type, a door type, a window type, etc.

In some implementations, the attribute is a size of a geospatial area. For example, the attribute (e.g., attribute value) may be a numerical value that indicates that size (e.g., in square feet, square meters, etc.).

In some implementations, the attribute is a size or size range of a type of geospatial area. For example, the attribute (e.g., attribute value) may indicate whether the space element corresponds to a large-sized space (e.g., predefined by an administrator as being larger than a first threshold area), a medium-sized space (e.g., predefined by an administrator as being less than or equal to the first threshold area but greater than or equal to a second threshold area), or a small-sized space (e.g., predefined by an administrator as being less than the second threshold area). As another example, the attribute may indicate the typical size or size range of the space based on the space type value for the space. In more detail, if the space type value is office, the computing server 210 may automatically fill in medium-sized space for the attribute value based on the space type value being an office. This attribute value may be updated, e.g., by an administrator or automatically by the computing server 210 based on a determined or extracted area size for the space element.

In some implementations, the attribute is a capacity of a geospatial area. For example, the attribute (e.g., attribute value) may be a numerical value corresponding to the maximum number of persons permitted in the space element. The value may be automatically determined by the computing server 210 based on, for example, the area size for the space element, the space type value for the space element, and/or codes or regulations. For example, based on a space element being an elevator and local regulations limiting elevator capacity to ten individuals, the computing server 210 may assign an attribute value of ten to the capacity attribute. Prior to this, the computing server 210 may identify which codes or regulations to obtain based on a geographic location of the space element.

In some implementations, the attribute is a capacity or capacity range of a type of geospatial area. For example, the attribute (e.g., attribute value) may indicate whether the space element corresponds to a large-capacity space (e.g., predefined by an administrator as having a capacity larger than a first threshold capacity), a medium-capacity space (e.g., predefined by an administrator as having a capacity less than or equal to the first threshold capacity but greater than or equal to a second threshold capacity), or a small-capacity space (e.g., predefined by an administrator as having less than the second threshold capacity). As another example, the attribute may indicate the typical capacity or capacity range of the space based on the space type value for the space. In more detail, if the space type value is office, the computing server 210 may automatically fill in small-capacity space for the attribute value based on the space type value being an office. This attribute value may be updated, e.g., by an administrator or automatically by the computing server 210 based on a determined or extracted maximum capacity for the space element.

The process 400 can include receiving input indicating a modification to the first version of the computer design model. The modification may be, for example, a modification to an attribute corresponding to the computer design model (e.g., a modification to a space attribute value of a space element), an addition of an attribute corresponding to the computer design model (an addition of a new space attribute to a space element, or an addition of a new space attribute and corresponding value to a space element), a removal of an attribute corresponding to the computer design model (e.g., a removal of a space attribute from a space element), etc. The modification may additionally or alternatively include the addition of a new geospatial area (e.g., space element) to the second version of the computer design model, or the removal of an existing geospatial area (e.g., space element) from the second version of the computer design model. The modification may additionally or alternatively include the modification to the preferences for a particular geospatial area or attribute. In response to a modification to the preferences, the computing server 210 may update the sync preferences 226 in accordance with the modification.

As an example, with respect to FIGS. 2-3, the computer device 202 may present the user interface 300. A user or an administrator may use the user interface 300 to update one or more CAD values of space attributes, to remove one or more space elements, to add one or more space elements, to update the preferences (e.g., the "action") for one or more space attributes, etc. In response to a CAD value update, the data sync module 116 may update the DWG file 208a in accordance with the update.

In some implementations, updating the second data using at least the portion of the first data may include updating the second data to reflect the modification to the first version of the computer design model.

The process 400 can include: identifying one or more other computer design models associated with the computer design model; extracting data from the one or more other computer design models; based on the data from the one or more other computer design models and the second data, determining that the second version of the computer design model and the one or more other computer design models share at least one attribute corresponding to the modification to the second version of the computer design model; and based on the modification to the second version of the computer design model, updating the at least one attribute shared by the second version of the computer design model and the one or more other computer design models. For example, with respect to FIG. 2, the computing server 210 can identify one or more other computer design models (e.g., from the database tables 220) that include or use a space element that has been updated during the data sync process (e.g., updated to reflect the CAD value). After identifying the one or more other computer design models, the computing server 210 may request the corresponding CAD drawings from computing device 202 and perform data synchronization using the obtained CAD drawings.

As another example, based on updates made to a computer design model during the data sync process or by a system administrator to the attribute definitions (e.g., the acceptable values for different attributes, acceptable value ranges for different attributes, thresholds that define an attribute, etc.), the computing server 210 can make corresponding updates to one or more other computer design models (e.g., whose data is stored in the database tables 220 and/or in the drawing files 108) and/or to the sync preferences 226. In more detail, if a user indicates through the interface 300 that the value "STAIR" for space type is permitted, the computing server 210 may update the sync preferences 226 to indicate that an error should not be generated for this value.

In some implementations, identifying the one or more other computer design models associated with the computer design model includes determining that the one or more other computer design models and the computer design model correspond to the same client. For example, each client may have their own set of attribute definitions that the can set and update for their computer design models. In response to a definition being updated by an administrator through, for example, the interface 300, the computing server 210 may update a subset of sync preferences 226 for the client such that the new definition is applied to all of the client's computer design models.

The process 400 can include determining that the data synchronization between the first version of the computer design model and the second version of the computer design model was successful, and in response to the determination, generating a notification indicating that the data synchronization between the first version of the computer design model and the second version of the computer design model was successful. For example, in response to successfully updating the database tables 220, updating the DWG file 208a, and/or generating the interactive layer 266, the data sync module 116 (or more generally the computing server 210) may generate a notification and transmit it to the computing device 202 or to one or more other user devices (e.g., a mobile device of the user 104, a mobile device of an administrator, etc.) over the network 250. The notification may be an SMS message, an MMS message, an email, an instant message, a dashboard message, etc. The notification may indicate that data synchronization is complete and/or that the corresponding computer design model that was successfully updated. For example, the notification may include a name for the computer design model, a geographic location or area corresponding to the computer design model, a name of the drawing file 108a, etc. The notification may include other information such as a date and/or time indicating when the data synchronization process was complete, errors or warning generated during the data synchronization process, etc.

The process 400 can include determining that the data synchronization between the first version of the computer design model and the second version of the computer design model was not successful, and in response to the determination, generating a notification indicating that the data synchronization between the first version of the computer design model and the second version of the computer design model was not successful. For example, in response to a failure while attempting to update the database tables 220, update the DWG file 208a, and/or generate the interactive layer 266, the data sync module 116 (or more generally the computing server 210) may generate a notification and transmit it to the computing device 202 or to one or more other user devices (e.g., a mobile device of the user 104, a mobile device of an administrator, etc.) over the network 250. The notification may be an SMS message, an MMS message, an email, an instant message, a dashboard message, etc. The notification may indicate that data synchronization is not complete and/or that the corresponding computer design model that was not successfully updated. For example, the notification may include a name for the computer design model, a geographic location or area corresponding to the computer design model, a name of the drawing file 108a, etc. The notification may include other information such as a date and/or time indicating when the data synchronization process failed, errors or warning generated during the data synchronization process, etc.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificiallygenerated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HyperText Markup Language (HTML) page, to a user device, e.g., for purposes of displaying data to and receiving user input from a user interacting with the user device, which acts as a client. Data generated at the user device, e.g., a result of the user interaction, can be received from the user device at the server.

Figure 5:
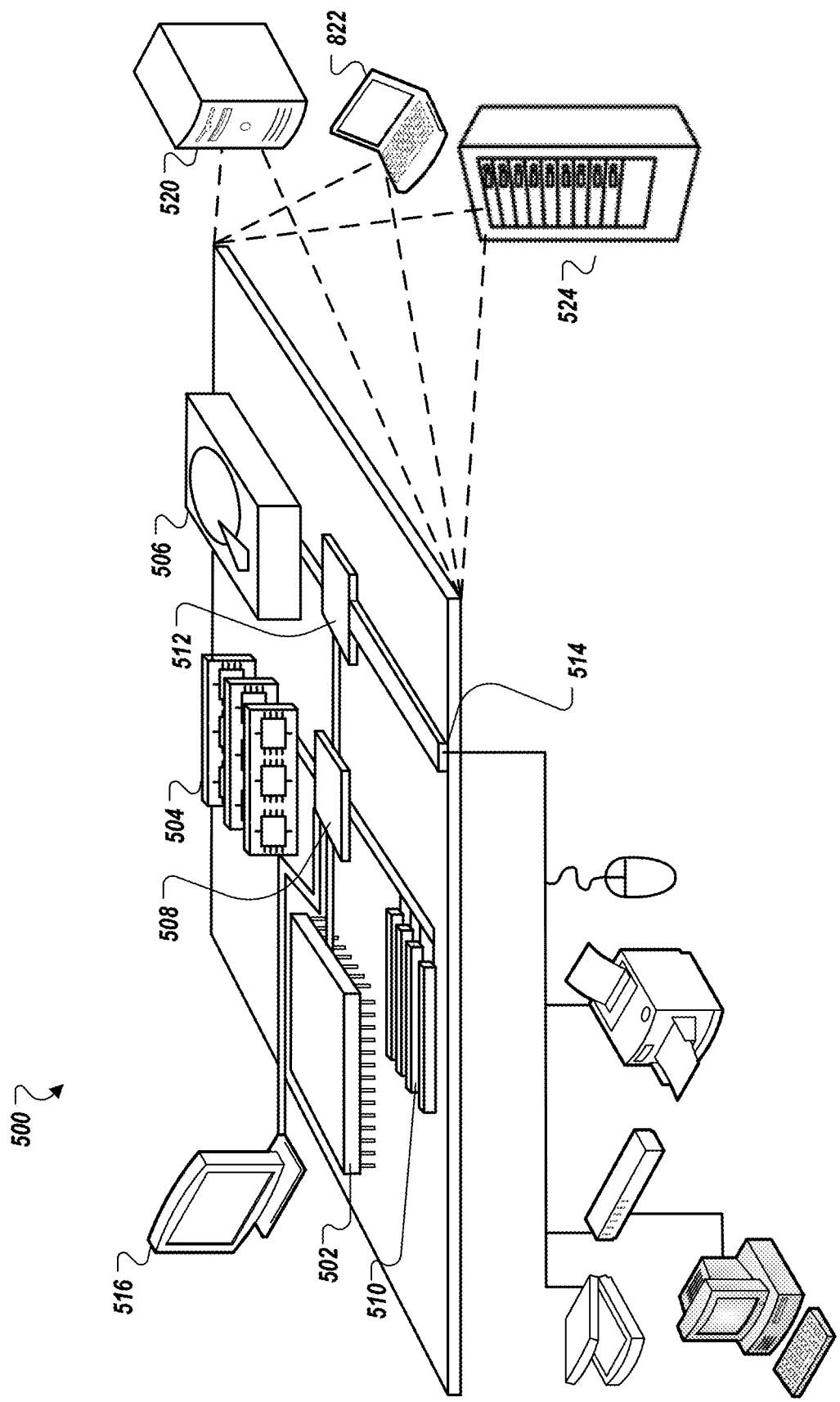
FIG. 5 illustrates an example block diagram of a computing system that can be used in connection with computer-implemented methods described in this document.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, smartwatches, head-worn devices, and other similar computing devices.

The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication (e.g., via a docking procedure) or for wireless communication (e.g., via Bluetooth or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims, described in the specification, or depicted in the figures can be performed in a different order and still achieve desirable results. In some cases, multitasking and parallel processing may be advantageous.

What is claimed is:

1. A computer implemented method comprising:
   receiving an indication to start a data synchronization between a first version of a computer design model stored on a device or extracted from a file stored on the device and a second version of the computer design model stored on a database of a management platform, the database being remote with respect to the device;
   extracting first data from the first version of the computer design model, the first data comprising first graphics and one or more first space elements corresponding to real-world items;
   extracting second data from the second version of the computer design model, the second data comprising second graphics and one or more second space elements;
   performing a comparison between the first data with the second data by comparing first space codes of the first graphics comprising identifiers of the first graphics to second space codes of the second graphics comprising identifiers of the second graphics and by comparing the one or more first space elements to the one or more second space elements using layer mapping, the layer mapping grouping layer types for extracting components from the one or more first space elements corresponding to the one or more second space elements of a respective layer;
   based on the comparison, updating at least one of the first data using at least a portion of the second data to generate updated first data or the second data using at least a portion of the first data to generate updated second data; and
   generating a geospatial representation using at least one of the updated second data or the updated first data.

2. The computer implemented method of claim 1, comprising:
receiving input indicating a modification to the second version of the computer design model,
wherein the modification is one or more of a modification to an attribute corresponding to the computer design model, an addition of an attribute corresponding to the computer design model, a removal of an attribute corresponding to the computer design model, an addition of a geospatial area to the computer design model, or the removal of an existing geospatial area from the computer design model, and
wherein updating the first data using at least the portion of the second data comprises updating the first data to reflect the modification to the second version of the computer design model.

3. The computer implemented method of claim 2, wherein the attribute comprises one or more of:
an identification of a geospatial area;
a location of a geospatial area;
one or more shapes that describe bounds of a geospatial area;
a type of geospatial area;
a size of a geospatial area;
a size or size range of a type of geospatial area;
a capacity of a geospatial area; or
a capacity or capacity range of a type of geospatial area.

4. The computer implemented method of claim 2, comprising:
identifying one or more other computer design models associated with the computer design model;
extracting data from the one or more other computer design models;
based on the data from the one or more other computer design models and the second data, determining that the second version of the computer design model and the one or more other computer design models share at least one attribute corresponding to the modification to the second version of the computer design model; and
based on the modification to the second version of the computer design model, updating the at least one attribute shared by the second version of the computer design model and the one or more other computer design models.

5. The computer implemented method of claim 4, wherein identifying the one or more other computer design models associated with the computer design model comprises determining that the one or more other computer design models and the computer design model correspond to a same client.

6. The computer implemented method of claim 1, wherein comparing the first data with the second data comprises:
identifying a conflict between the first data and the second data; and
determining that the conflict should be resolved in favor of the second data,
wherein updating the first data using at least the portion of the second data comprises updating the first data using a portion of the second data corresponding to the conflict.

7. The computer implemented method of claim 6, wherein determining that the conflict should be resolved in favor of the second data comprises:
accessing preferences; and
determining that the conflict should be resolved in favor of the second data based on the preferences.

8. The computer implemented method of claim 7, wherein:
the conflict corresponds to an attribute of the computer design model such that the first version of the computer design model has a first value for the attribute and the second version of the computer design model has a second value for the attribute that is different from the first value;
the preferences indicate that for the attribute the first version of the computer design model has priority over the second version of the computer design model; and
determining that the conflict should be resolved in favor of the second data based on the preferences comprises determining that the conflict should be resolved in favor of the second data based on the first version of the computer design model having priority for the attribute over the second version of the computer design model.

9. The computer implemented method of claim 1, wherein comparing the first data with the second data comprises:
determining that a second portion of the first data is incomplete; and
based on the second portion of the first data being incomplete, determining that a portion of the second data corresponding to the second portion of the first data should be used to update the first data,
wherein updating the first data using at least the portion of the second data comprises updating the first data using the portion of the second data corresponding to the second portion of the first data that is incomplete.

10. The computer implemented method of claim 1, wherein generating the geospatial representation comprises:
extracting a polygon layer from the computer design model, the polygon layer containing a plurality of polygons that correspond to representations of geospatial areas in the computer design model;
extracting a geospatial identification layer from the computer design model, the geospatial identification layer containing a plurality of identifications that correspond to the representations of geospatial areas in the computer design model; and
iteratively matching the polygons in the polygon layer with corresponding identifications in the geospatial identification layer.

11. The computer implemented method of claim 10, wherein iteratively matching the polygons in the polygon layer with the corresponding identifications in the geospatial identification layer comprises determining for each polygon and identification pair that a geospatial area corresponds to both the polygon and identification such that a location associated with identification is bounded by its corresponding polygon.

12. The computer implemented method of claim 10, comprising:
requesting the first version of the computer design model that has been updated using the updated first data from the device to generate an updated first version of the computer design model; and
importing the updated first version of the computer design model into the management platform,
wherein extracting the polygon layer from the computer design model comprises extracting the polygon layer from the updated first version of the computer design model, and
wherein extracting the geospatial identification layer from the computer design model comprises extracting the geospatial identification layer from the updated first version of the computer design model.

13. The computer implemented method of claim 1, comprising:

determining that the data synchronization between the first version of the computer design model and the second version of the computer design model was successful; and in response to the determination, generating a notification indicating that the data synchronization between the first version of the computer design model and the second version of the computer design model was successful.

14. The computer implemented method of claim 1, comprising:

presenting on an interface of the management platform a table that comprises:

a first column containing a plurality of values of the first data;

a second column containing a plurality of values of the second data; and a plurality of rows that correspond to different attributes of the computer design model;

determining that there is an error corresponding to at least one value of the of the plurality of values of the first data or the plurality of values of the second data; and based on the error, visually distinguishing the at least one value from one or more other values in the table.

15. The computer implemented method of claim 14, wherein determining that there is an error corresponding to the at least one value comprises:

determining that a first value of a plurality of values of the first data does not match a second value of the a plurality of values of the second data, wherein visually distinguishing the at least one value from one or more other values in the table comprises visually distinguishing the first value and the second value from one or more other values in the table;

determining that a first value of the plurality of values of the first data is a null value and corresponds to a second value of the plurality of values of the second data that is a valid value, wherein visually distinguishing the at least one value from one or more other values in the table comprises visually distinguishing the first value from one or more other values in the table; or determining that a first value of the plurality of values of the second data is a null value and corresponds to a second value of the plurality of values of the first data that is a valid value, wherein visually distinguishing the at least one value from one or more other values in the table comprises visually distinguishing the first value from one or more other values in the table.

16. The computer implemented method of claim 1, wherein updating at least one of the first data using at least a portion of the second data or the second data using at least a portion of the first data comprises updating the first data using at least a portion of the second data and the second data using at least a portion of the first data.

17. The computer implemented method of claim 1, comprising:

filtering information from the first version of the computer design model to generate a filtered first version of the computer design model, wherein extracting the first data from the first version of the computer design model comprises extracting the first data from the filtered first version of the computer design model.

18. The computer implemented method of claim 17, wherein filtering the information from the first version of the computer design model comprises:

identifying a template that indicates what information or types of information should be filtered; and using the template to filter the information from the first version of the computer design model.

19. A system comprising:

a processor; and a computer-readable storage medium coupled with the processor, wherein the computer-readable storage medium comprising a program for execution by the processor, the program comprising instructions which, when executed by the processor, cause the processor to perform operations comprising:

receiving an indication to start a data synchronization between a first version of a computer design model stored on a device or extracted from a file stored on the device and a second version of the computer design model stored on a database of a management platform, the database being remote with respect to the device;

extracting first data from the first version of the computer design model, the first data comprising first graphics and one or more first space elements corresponding to real-world items;

extracting second data from the second version of the computer design model, the second data comprising second graphics and one or more second space elements;

performing a comparison between the first data with the second data by comparing first space codes of the first graphics comprising identifiers of the first graphics to second space codes of the second graphics comprising identifiers of the second graphics and by comparing the one or more first space elements to the one or more second space elements using layer mapping, the layer mapping grouping layer types for extracting components from the one or more first space elements corresponding to the one or more second space elements of a respective layer;

based on the comparison, updating at least one of the first data using at least a portion of the second data to generate updated first data or the second data using at least a portion of the first data to generate updated second data; and generating a geospatial representation using at least one of the updated second data or the updated first data.

20. A non-transitory computer-readable storage medium comprising a program for execution by a processor of a device, the program comprising instructions which, when executed by the processor, cause the device to perform operations comprising:

receiving an indication to start a data synchronization between a first version of a computer design model stored on a device or extracted from a file stored on the device and a second version of the computer design model stored on a database of a management platform, the database being remote with respect to the device;

extracting first data from the first version of the computer design model, the first data comprising first graphics and one or more first space elements corresponding to real-world items;

extracting second data from the second version of the computer design model, the second data comprising second graphics and one or more second space elements;

performing a comparison between the first data with the second data by comparing first space codes of the first graphics comprising identifiers of the first graphics to second space codes of the second graphics comprising identifiers of the second graphics and by comparing the one or more first space elements to the one or more second space elements using layer mapping, the layer mapping grouping layer types for extracting components from the one or more first space elements corresponding to the one or more second space elements of a respective layer;
based on the comparison, updating at least one of the first data using at least a portion of the second data to generate updated first data or the second data using at least a portion of the first data to generate updated second data; and
generating a geospatial representation using at least one of the updated second data or the updated first data.

\* \* \* \* \*